United States Patent
Lukic et al.

(10) Patent No.: US 10,697,796 B2
(45) Date of Patent: Jun. 30, 2020

(54) METHOD FOR CHECKING AND/OR CALIBRATING A VERTICAL AXIS OF A ROTATING LASER

(71) Applicant: Hilti Aktiengesellschaft, Schaan (LI)

(72) Inventors: Sasha Lukic, Buchs (CH); Guenter Sanchen, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 133 days.

(21) Appl. No.: 15/778,592

(22) PCT Filed: Nov. 23, 2016

(86) PCT No.: PCT/EP2016/078498
§ 371 (c)(1),
(2) Date: May 23, 2018

(87) PCT Pub. No.: WO2017/093091
PCT Pub. Date: Jun. 8, 2017

(65) Prior Publication Data
US 2018/0356249 A1 Dec. 13, 2018

(30) Foreign Application Priority Data
Nov. 30, 2015 (EP) .................................. 15197023

(51) Int. Cl.
*G01C 5/00* (2006.01)
*G01C 25/00* (2006.01)
*G01C 15/00* (2006.01)

(52) U.S. Cl.
CPC ........... *G01C 25/00* (2013.01); *G01C 15/004* (2013.01); *G01C 15/008* (2013.01)

(58) Field of Classification Search
CPC .................................................... G01C 15/004
USPC ................................................... 33/228, 290
See application file for complete search history.

(56) References Cited

U.S. PATENT DOCUMENTS

| 2003/0145474 A1* | 8/2003 | Tacklind | G01C 15/004 33/290 |
| 2005/0007125 A1* | 1/2005 | Heger | G01C 9/14 324/662 |
| 2010/0186243 A1* | 7/2010 | Schumacher | G01B 21/22 33/228 |

(Continued)

FOREIGN PATENT DOCUMENTS

| CN | 101451833 A | 6/2009 |
| DE | 197 16 710 A1 | 11/1997 |
| EP | 2 833 159 A1 | 2/2015 |

OTHER PUBLICATIONS

PCT/EP2016/078498, International Search Report (PCT/ISA/220 and PCT/ISA/210) dated Jan. 23, 2017, with partial English translation, enclosing Written Opinion of the International Searching Authority (PCT/ISA/237) (Fourteen (14) pages).

(Continued)

*Primary Examiner* — George B Bennett
(74) *Attorney, Agent, or Firm* — Crowell & Moring LLP

(57) ABSTRACT

A method for checking and/or calibrating a vertical axis of a rotating laser which projects a first laser beam that can rotate about an axis of rotation and a second, stationary laser beam, using a laser receiver. The rotating laser is positioned at a measurement distance from the laser receiver, the rotating laser being oriented in a vertical position, and the laser receiver having a transverse arrangement.

15 Claims, 9 Drawing Sheets

(56) References Cited

U.S. PATENT DOCUMENTS

2014/0283397 A1* 9/2014 Fessler .................. G01B 11/00
                                                        33/228
2018/0335316 A1* 11/2018 Lukic ..................... G01C 25/00
2019/0154443 A1* 5/2019 Winter ................. G01S 7/4813
2019/0360806 A1* 11/2019 Ohtomo ................ G01C 15/06

OTHER PUBLICATIONS

"Laser LAR-250—Bedienungsanleitung", Stabile, Apr. 1, 2008, XP002757136, URL: http://ww.stabila.de/cms/upload/download/pdf/manual/de/lar250_manual_de.pdf, 17 total pages.

U.S. Patent Application, "Method for Orienting a Device Axis in a Defined State", filed May 23, 2018, Inventor: Sasha Lukic.

U.S. Patent Application, "Method for Measuring an Operating Temperature of Equipment", filed May 23, 2018, Inventor: Sasha Lukic.

U.S. Patent Application, "Method for Checking and/or Calibrating a Horizontal Axis of a Rotating Laser", filed May 23, 2018, Inventor: Sasha Lukic et al.

U.S. Patent Application, "Method for Measuring a Measurement Distance Between a Rotating Laser and a Laser Receiver", filed May 23, 2018, Inventor: Andreas Winter et al.

U.S. Patent Application, "Method for Checking a Rotary Laser Level for Cone Errors", filed May 23, 2018, Inventor: Sasha Lukic.

\* cited by examiner

METHOD FOR CHECKING AND/OR CALIBRATING A VERTICAL AXIS OF A ROTATING LASER

CROSS REFERENCE TO RELATED APPLICATIONS

This application claims the priority of International Application No. PCT/EP2016/078498, filed Nov. 23, 2016 and European Patent Document No. 15197023.3, filed Nov. 30, 2015, the disclosures of which are expressly incorporated by reference herein.

BACKGROUND AND SUMMARY OF THE INVENTION

The present invention relates to a method for checking and/or calibrating a vertical axis of a rotating laser.

Rotating lasers are used indoors and outdoors for leveling and marking tasks, such as displaying laser markings running horizontally, vertically, or diagonally on a target surface, or determining and checking horizontal heights, perpendicular lines, alignments, and plumb points. Rotating lasers can be arranged in various device positions, which are designed as horizontal positions and vertical positions. One thereby differentiates between horizontally usable rotating lasers, which are solely used in the horizontal position, and horizontally and vertically usable rotating lasers, which are used in the horizontal position and the vertical position. Horizontally usable rotating lasers have as device axes a first horizontal axis and a second horizontal axis, which run perpendicular to each other and span a horizontal plane. Horizontally and vertically usable rotating lasers have as a device axis, in addition to the first and second horizontal axes, a vertical axis that runs perpendicular to the horizontal plane of the first and second horizontal axes.

To ensure the accuracy of a rotating laser when in operation, the accuracy must be checked regularly and if a maximum difference defined by the device manufacturer is exceeded, the rotating laser must be calibrated. The accuracy of the rotating laser is thereby checked for every device axis. Methods are known for checking and/or calibrating a horizontal axis and for checking and/or calibrating a vertical axis. For horizontally usable rotating lasers, the first and second horizontal axes are checked sequentially, wherein the sequence is arbitrary. For horizontally and vertically usable rotating lasers, after the first and second horizontal axes are checked, a check of the vertical axis is performed.

The orientation of the device axes in a defined state occurs by means of a leveling device of the rotating laser. The defined state of the rotating laser in the horizontal position is referred to as the horizontal state and in the vertical position as the vertical state. The leveling device comprises a first leveling unit that orients the first horizontal axis in a first defined state, a second leveling unit that orients the second horizontal axis in a second defined state, and for a vertically usable rotating laser, there is a third leveling unit that orients the vertical axis in a third defined state. Each of the leveling units comprises an inclination sensor that measures the inclination of the device axis, and an adjustment element with which the inclination of the device axis can be adjusted. Ideally, the inclination sensors are oriented parallel to the allocated device axes. If an inclination sensor is not parallel to the allocated device axis, the device axis will have an inclination error.

In the operating instructions of their rotating lasers, the device manufacturers of horizontally and vertically usable rotating lasers define methods for checking the vertical axis, which are to be performed regularly by the operator, and methods for calibrating the vertical axis, which are to be performed regularly by the operator, if the established maximum difference for the vertical axis is exceeded. The known methods for checking and/or calibrating a vertical axis are performed in the vertical position of the rotating laser. The rotating lasers are set up on a stable substrate or on a tripod at a measurement distance to a measuring surface. Every device manufacturer defines the measurement distance between the rotating laser and the measuring surface and establishes a maximum difference for the vertical axis.

In regard to the LAR-250 rotating laser by Stabila, the rotating laser is mounted on a tripod and can be adjusted about a rotary axis of the tripod. The LAR-250 rotating laser produces a first laser beam rotating about an axis of rotation and a stationary second laser beam that runs perpendicular to the laser plane of the rotating first laser beam; the vertical axis is checked using the stationary second laser beam. The vertical axis is checked between a first measuring surface and a parallel second measuring surface, which are at a distance of at least 10 m to each other. The LAR-250 rotating laser is set up in a first spatial position directly in front of the first measuring surface and in a second spatial position directly in front of the second measuring surface. A reversal measurement takes place in the spatial positions, wherein the LAR-250 rotating laser is oriented manually or using an automatic rotary platform in the angular positions. In the first spatial position, the LAR-250 rotating laser is rotated into a first angular position, in which the vertical axis is oriented toward the first measuring surface, and the device axes are oriented in the vertical state. The incident position of the second laser beam on the first measuring surface is marked as the first control point. The LAR-250 rotating laser is rotated by 180° about the axis of rotation of the tripod into a second angular position, in which the vertical axis is oriented, in the axis direction opposite to the first angular position, to the first measuring surface, and the incident position of the second laser beam on the second measuring surface is marked as the second control point. The LAR-250 rotating laser is positioned along the vertical axis from the first spatial position into the second spatial position, and device axes of the LAR-250 rotating laser are oriented in the vertical state. The height of the LAR-250 rotating laser is adjusted using the height adjustment device of the tripod until the incident position of the second laser beam on the second measuring surface coincides with the second control point. The LAR-250 rotating laser is rotated 180° about the axis of rotation of the tripod and the incident position of the second laser beam on the first measuring surface is marked as a third control point. The distance between the first and third control points is calculated as a difference, which is compared against the maximum difference of 2 mm for the vertical axis, as calculated by Stabila. If the difference is greater than the maximum difference, calibration of the vertical axis is required. The vertical axis is calibrated using the first and third control points. The LAR-250 rotating laser is adjusted using the leveling device until the stationary second laser beam is arranged centrally between the first and third control points. This position of the stationary second laser beam is stored as the new reference value or new zero position for the vertical state of the vertical axis.

In regard to the GRL 500 HV rotating laser by Bosch Power Tools, the vertical axis is checked using a plumb line, and calibrated if required. The GRL 500 HV rotating laser produces a rotating first laser beam and a stationary second laser beam, which runs perpendicular to the laser plane of the rotating first laser beam; the vertical axis is checked using the rotating first laser beam. For the GRL 500 HV rotating laser, Bosch Power Tools established a measurement distance of 10 m to the measuring surface and a measuring surface height of 10 m. Using the plumb line, the operator draws a perpendicular comparison line on the measuring surface and compares the vertical laser plane, which the rotating first laser beam generates, against the perpendicular comparison line. The laser beam is adjusted using the leveling device of the rotating laser in such a manner that the rotating first laser beam centrally strikes the plumb line at the upper end of the measuring surface. The incident position of the rotating first laser beam is marked as a control point on the measuring surface and the distance between the control point and the perpendicular comparison line is calculated as a difference.

The difference is compared against the maximum difference of 1 mm established by Bosch Power Tools for the vertical axis. If the difference is greater than the maximum difference, calibration of the vertical axis is required.

On the GRL 500 HV rotating laser, the vertical axis is calibrated in a separate procedure conducted after the method for checking the vertical axis. For calibrating the vertical axis, Bosch Power Tools established a measurement distance between 5 m and 10 m to the measuring surface and a measuring surface height of 10 m. Using the plumb line, the operator draws a perpendicular comparison line on the measuring surface. The tripod is oriented in such a manner that the rotating first laser beam crosses the perpendicular comparison line. The first laser beam is adjusted using the leveling device until the laser plane spanning the rotating first laser beam is arranged as parallel as possible to the perpendicular comparison line. If no congruence is achieved between the rotating first laser beam and the perpendicular comparison line, the method steps (orienting tripod, leveling rotating laser, and adjusting laser beam using the leveling device) are repeated. When congruency is achieved between the rotary first laser beam and the perpendicular comparison line, the adjustment of the leveling device is stored as a new reference value or new zero position for the vertical axis. After calibration, an additional loop is provided for checking the vertical axis for inclination error. If the difference lies within the maximum difference, the GRL 500 HV rotating laser may be operated with the specified accuracy when handled properly. If the difference lies outside the maximum difference, the GRL 500 HV rotating laser must be adjusted by the device manufacturer.

In regard to the TRIAX UL-300 rotating laser by Sokkia, the vertical axis is also checked using a plumb line and calibrated, if necessary. The TRIAX UL-300 rotating laser produces a rotating first laser beam and a stationary second laser beam, which runs perpendicular to the laser plane of the first laser beam; the vertical axis is checked using the rotating first laser beam. For the TRIAX UL-300 rotating laser, Sokkia established a measurement distance of 6 m to the measuring surface and a measuring surface height of at least 2.5 m. Using a plumb line, the operator draws a perpendicular comparison line on the measuring surface and compares the vertical laser plane generated by the rotating first laser beam against the perpendicular comparison line. If the first laser beam is distorted, calibration of the vertical axis is required. The vertical axis can be calibrated using a rotating laser beam (first laser beam in the rotating mode) or a laser beam moving back and forth (first laser beam in line mode). The laser beam is adjusted using the leveling device until the marking generated by the laser beam on the measuring surface is vertical and congruent with the perpendicular comparison line. When congruency is achieved between the laser beam and the perpendicular comparison line, the adjustment of the leveling device is stored as a new reference value or new zero position for the vertical state of the vertical axis.

The known methods for checking and/or calibrating a vertical axis are prone to error and not suited for automation. The method provided by the Stabila LAR-250 rotating laser for checking and calibrating the vertical axis is dependent on the care and accuracy with which the operator marks the incident positions of the laser beam as control points on the measuring surface. It is also disadvantageous in that the operator must perform measurements at two different spatial positions and must also move the LAR-250 rotating laser. The methods provided by the Bosch Power Tools GRL 500 HV for checking and calibrating a vertical axis using a plumb line have the disadvantage of an unusual measurement environment. For checking and calibrating the vertical axis, Bosch Power Tools requires a measuring surface having a height of 10 m. For many measuring tasks inside, there are no measuring surfaces having a height of 10 m. In addition, it may be very awkward for an operator to attach a plumb line at a height of 10 m. The method provided by the Sokkia TRIAX UL300 rotating laser for checking and calibrating a vertical axis using a plumb line depends on the assessment of the operators when they see the marking produced by the rotating first laser beam on the measuring surface as being distorted and the method does not contain any quantitative criterion by means of which operators can decide whether calibration of the vertical axis is required.

The object of the present invention consists of developing a method for checking and/or calibrating a vertical axis of a rotating laser with a high degree of accuracy. In addition, the method is to be adaptable to the respective ambient conditions of the measurement environment and be suitable for automated execution.

According to the invention, the method for checking and/or calibrating a vertical axis of a rotating laser, which projects a first laser beam that is rotatable about an axis of rotation and a stationary second laser beam, comprises the steps:

The rotating laser is positioned at a measurement distance Dv to a laser receiver, wherein the rotating laser is oriented in the vertical position and the laser receiver is oriented in a transverse arrangement, The device axes of the rotating laser, which are designed as the first horizontal axis, the second horizontal axis, and a vertical axis, are oriented in a defined state, wherein the defined state is established by a first zero position for the first horizontal axis, a second zero position for the second horizontal axis, and a third zero position for the vertical axis, The rotating laser is arranged in a first angular position, wherein the vertical axis is oriented in the first angular position on a detection field of the laser receiver, The incident position of the second laser beam on the detection field of the laser receiver is defined as a first control point and the distance of the first control point to a zero position of the detection field is stored as the first height offset, The rotating laser is arranged in a second angular position, wherein the second angular position is rotated by 180° to the first angular position about the axis of rotation of the rotating laser.

The incident position of the second laser beam on the detection field of the laser receiver is defined as the second control point and the distance of the second control point to the zero position of the detection field is stored as a second height offset, The distance between the first control point and the second control point is calculated as difference Δ from the first and second height offsets, The measurement distance Dv between the rotating laser and the laser receiver is determined, and The difference Δ is compared against a maximum difference Δmax.

In regard to the method according to the invention for checking and/or calibrating a vertical axis, the measurement distance between the rotating laser and the laser receiver is measured and is not set to a predetermined measurement distance. This has the advantage that the measurement distance can be adapted to the ambient conditions of the measurement environment. In the method according to the invention, the method step, in which the measurement distance is determined between the rotating laser and the laser receiver, can be executed at various locations. In the method according to the invention, the incident positions of the laser beam are determined using a laser receiver and stored as height offsets to the zero position of the detection field. By using a laser receiver with a measurement function, the measurement accuracy is increased in executing the method. The laser receiver determines the incident position of the laser beam on the detection field according to a fixed routine.

This has the advantage that the accuracy of the method is independent of the care taken by the operator and is suited for the automated execution of the method. When the rotating laser is arranged on a motorized rotating platform, the method according to the invention can be conducted in a fully automated manner. In a semi-automatic design, the operator manually arranges the rotating laser into the first and second angular positions upon request; all other method steps are carried out by the rotating laser and laser receiver.

Preferably, the measurement distance between the rotating laser and the laser receiver is determined by means of the second laser beam and the laser receiver. The method according to the invention has the advantage that the ambient conditions of the measurement environment can be taken into account when checking and/or calibrating the vertical axis, and that furthermore no additional device components are required. The measurement distance between the rotating laser and the laser receiver is selected as permitted by the measurement environment.

In a particularly preferred manner, the measurement distance between the rotating laser and the laser receiver is determined as a first distance by means of a first measuring procedure, as a second distance by means of a second measuring procedure, or as a distance averaged from the first and second distances. If the measurement distance between the rotating laser and the laser receiver can be determined by means of various measuring procedures, the method for checking and/or calibrating a vertical axis can be adapted to the ambient conditions of the measurement environment and the functions of the measuring devices (rotating laser and laser receiver).

In a first preferred embodiment, the measurement distance between the rotating laser and the laser receiver is determined as a first distance by means of the first measuring procedure. In the first measuring procedure, the laser beam is inclined by an inclination angle and the distance of the inclined laser beam to the zero position of the detection field is stored. The first measuring procedure is suited for laser receivers with a measuring function, which can measure the distance of a laser beam to a zero position as a height offset. In the method according to the invention, the measurement of the first distance may occur in the first angular position or the second angular position. The inclination of the laser beam by the inclination angle may be performed by means of the leveling device of the rotating laser. The leveling device comprises a first leveling unit that orients the first horizontal axis in a first defined state, a second leveling unit that orients the second horizontal axis in a second defined state, and a third leveling unit that orients the vertical axis in a third defined state.

The rotating laser may be arranged in an arbitrary first angular position; one must only ensure that the vertical axis is oriented toward the detection field of the laser receiver. If the measurement distance between the rotating laser and the laser receiver is determined as a first distance by means of the first measuring procedure, the inclination of the laser beam must be measurable from the detection field as a height offset. Therefore, it is advantageous if the first or second horizontal axis of the rotating laser is oriented parallel to a longitudinal direction of the detection field. If the first horizontal axis is oriented parallel to the longitudinal direction of the detection field, the laser beam will be inclined by means of the first leveling unit about the second horizontal axis, wherein the adjustment of the inclination angle occurs by means of a first adjusting element and a first inclination sensor of the first leveling unit. When the second horizontal axis is oriented parallel to the longitudinal direction of the detection field, the laser beam will be inclined by means of the second leveling unit about the first horizontal axis, wherein the adjustment of the inclination angle occurs by means of a second adjusting element and a second inclination sensor of the second leveling unit.

In a first variant of the first measuring procedure, the rotating laser is oriented vertically, the vertically oriented laser beam is set to the zero position of the detection field, the laser beam is inclined toward the laser receiver by an inclination angle $\alpha$, the incident position of the inclined laser beam on the detection field of the laser receiver is determined as a first measuring point, the distance of the first measuring point to the zero position of the detection field is stored as first height $h_1 = h(\alpha)$ and the first distance $d_1$ is calculated from the inclination angle $\alpha$ and a height difference $\Delta h$ between the first height $h_1$ and the zero position of the detection field. When the transverse direction of the laser receiver is oriented parallel to the direction of gravity, the first distance $d_1$ can be calculated according to the formula $\tan(\alpha) = \Delta h/d_1$. For small inclination angles $\alpha$, $\tan(\alpha) \approx \sin(\alpha)$ approximately. The first variant of the first measuring procedure is particularly suited for rotating lasers and laser receivers with an auto-alignment function, in which the height adjustment of the laser beam to the zero position of the detection field of the laser receiver can be performed automatically.

In a second variant of the first measuring procedure, the rotating laser is oriented vertically, the incident position of the vertically oriented laser beam on the detection field of the laser receiver is determined as a reference point, the distance of the reference point to the zero position of the detection field is stored as reference height $h_0 = h(0°)$, the laser beam is inclined by inclination angle $\alpha$, the incident position of the inclined laser beam on the detection field is determined as a first measuring point, the distance of the first measuring point to the zero position of the detection field is stored as first height $h_1 = h(\alpha)$ and the first distance $d_1$ is calculated form the inclination angle $\alpha$ and a height difference $\Delta h$ between the first height and the reference height.

When the transverse direction of the laser receiver is oriented parallel to the direction of gravity, the first distance d1 can be calculated according to the formula $\tan(\alpha)=(h_1-h_0)/d1=\Delta h/d_1$. For small inclination angles $\alpha$, $\tan(\alpha)\approx \sin(\alpha)$ approximately. The second variant of the first measuring procedure is suited for rotating lasers and laser receivers without an auto-alignment function. The operator must only ensure that the laser beam inclined at inclination angle $\alpha$ is captured by the detection field of the laser receiver. For a rotating laser and laser receiver with an auto-alignment function, the laser beam is automatically moved to the region of the detection field.

In a third variant of the first measuring procedure, the rotating laser is oriented vertically, the vertically oriented laser beam is inclined in an inclination direction by inclination angle $\alpha$, the incident position of the inclined laser beam on the detection field of the laser receiver is determined as the first measuring point, the distance of the first measuring point to the zero position of the detection field is stored as first height $h_1=h(\alpha)$, the laser beam is inclined in an opposing inclination direction by a negative inclination angle $-\alpha$, the incident position of the inclined laser beam on the detection field is determined as the second measuring point, the distance of the second measuring point to the zero position of the detection field is stored as second height $h_2=h(-\alpha)$ and the first distance ($d_1$) is calculated from the inclination angle $\alpha$ and a height difference $\Delta h$ between the first height and the second height. When the transverse direction of the laser receiver is oriented parallel to the direction of gravity, the first distance d1 can be calculated according to the formula $\tan(2\alpha)=(h(\alpha)-h(-\alpha))/d_1=\Delta h/d_1$. For small inclination angles $\alpha$, $\tan(2\alpha)\approx \sin(2\alpha)$ approximately. The third variant of the first measuring procedure is suitable for rotating lasers and laser receivers with and without an auto-alignment function. When the laser beam is initially oriented to the zero position of the detection field or at least in the vicinity of the zero position, the entire detection height of the detection field can be used. For a device system with an auto-alignment function, the adjustment to the zero position can be performed automatically.

In a second preferred embodiment, the measurement distance between the rotation laser and the laser receiver is determined as the second distance by means of the second measuring procedure. In the second measuring procedure, the rotating laser is oriented vertically, the laser beam is moved at a known speed $v_R$, the signal length $t_s$ of the laser beam on the detection field of the laser receiver is determined and the second distance $d_2$ is calculated from the speed $v_R$, signal length $t_s$ and detection width $B_D$ of the detection field. When the transverse direction of the laser receiver is oriented parallel to the direction of gravity, the second distance $d_2$ can be calculated according to the formula $t_s/t_{full}=B_D/(2\pi d_2)$, where $t_{full}=60/v_R$. Speed $v_R$ is indicated in revolutions per minute and time $t_{full}$ required for one revolution is $60/v_R$. The second measuring procedure is suitable for rotation lasers and laser receivers without an auto-alignment function. The laser receiver must be able to measure signal length $t_s$ of the laser beam on the detection field.

In a third preferred embodiment, the measurement distance between the rotating laser and the laser receiver is determined as the distance averaged from the first and second distances. By averaging the first and second distances, the accuracy with which one can determine the measurement distance between the rotating laser and the laser receiver, can be increased. The first distance, which is determined using the first measuring procedure, is greater than or equal to the actual measurement distance. When the transverse direction of the laser receiver is not oriented parallel to the direction of gravity but is inclined in relation to the direction of gravity, the horizontal distance perpendicular to the direction of gravity is less than the distance, which the detection field of the laser receiver measured. The second distance, which is determined using the second measuring procedure, is less than or equal to the actual measurement distance. When the transverse direction of the laser receiver is not oriented parallel to the direction of gravity but is inclined in relation to the direction of gravity, the vertical distance in the direction of gravity, which the laser beam passes over on the detection field, is greater than detection width BD of the detection field.

In a preferred development of the method, an inclination of the laser receiver relative to a direction of gravity is determined as a first vertical angle $\varphi_1$ in a first vertical plane and/or as a second vertical angle $\varphi_2$ in a second vertical plane, wherein the vertical plane is spanned by the direction of gravity and a perpendicular vector of the detection field of the laser receiver and the second vertical plane is spanned by a longitudinal direction and a transverse direction of the detection field. The first vertical angle $\varphi_1$ is measured between the perpendicular vector of the detection field and the direction of gravity, wherein the first vertical angle $\varphi_1$ represents the deviation of 90° between the perpendicular vector and the direction of gravity, and the second vertical angle $\varphi_2$ is measured between the direction of gravity and the longitudinal direction of the detection field. In executing the method according to the invention, the laser receiver is oriented in a transverse arrangement, wherein the longitudinal direction of the detection field should run perpendicular to the direction of gravity and the transverse direction of the detection field should run parallel to the direction of gravity. By inclining the laser receiver relative to the direction of gravity, the horizontal and vertical distances deviate from the distances that the detection field of the laser receiver measured. If the inclination of the laser receiver is known, the dimensions can be corrected accordingly. The laser receiver may be inclined relative to the direction of gravity by the first and/or second vertical angle. The inclination of the laser receiver can be measured by means of a 2-axis acceleration sensor or by means of two 1-axis acceleration sensors.

In a particularly preferred manner, in the evaluation with the laser receiver for the first vertical angle $\varphi_1$ and/or the second vertical angle $\varphi_2$, an angle-dependent correction factor $\cos(90°-\varphi_1)$, $\cos(90°-\varphi_2)$, $1/\cos(90°-\varphi_2)$ is multiplied. By the multiplication with an angle-dependent correction factor or with multiple angle-dependent correction factors, the inclination of the laser receiver can be compensated by the first vertical angle $\varphi_1$ and/or the second vertical angle $\varphi_2$. In the formulas that use the measuring function of the laser receiver and measure distances on the detection field in the longitudinal direction, the distances are multiplied by a correction factor $\cos(90°-\varphi_1)=\sin(\varphi_1)$ for the first vertical angle $\varphi_1$ and a correction factor $\cos(90°-\varphi_2)=\sin(\varphi_2)$ for the second vertical angle $\varphi_2$. The correction factor $\cos(90°-\varphi_1)*\cos(90°-\varphi_2)=\sin(\varphi_1)*\sin(\varphi_2)$ is to be taken into account in the distance measurement of the measurement distance using the first measuring procedure, in determining the difference between the first and second control points, and calculating the correction angle within the scope of the method according to the invention. In regard to the distance measurement of measurement distance $D_v$ as the second distance using the second measuring procedure, one does not use the conventional measuring function of the laser receiver in the longitudinal direction, but one uses the detection width in the transverse direction. By inclining the laser receiver in the second vertical plane by second vertical angle $\varphi_2$, the vertical distance that the laser beam passes over in the detection field is greater than the detection width $B_D$ of the detection field. The signal length of the laser beam corresponds to the vertical distance in the detection field. For the vertical distance, the correlation $BD/\cos(90°-\varphi_2)=B_D/\sin(\varphi_2)$ applies. An inclination of the laser receiver by the first vertical angle $\varphi 1$ does not change the vertical distance. The angle-dependent correction factor $1/\cos(90°-\varphi_2)=1/\sin(\varphi_2)$ is taken into account in the distance measurement using the second measuring procedure.

In a preferred development of the method, for orienting the vertical axis in the defined state, multiple zero positions are included as a function of a temperature or a temperature-dependent measured value and stored in a characteristic curve. The term "characteristic curve" thereby comprises both a continuous characteristic curve as well as a table with discrete value pairs of zero positions and temperatures, or of zero positions and temperature-dependent measured values. The stored characteristic curve represents for the vertical axis of the rotating laser a correlation between the temperature and the temperature-dependent measured value and the zero position of the inclination sensor. The inclination angle that corresponds to the defined state of the vertical axis is defined as the zero position. From the characteristic curve, one can read a zero position for every temperature from the approved operating temperature range.

Preferably, the temperature or the temperature-dependent measured variable of the rotating laser is measured, the zero position associated with the temperature or measured value is determined from the characteristic curve, and the vertical axis is oriented in the state defined by the zero position. By means of the temperature measurement, one can increase the device accuracy of the rotating laser, since the influence of the temperature on the device accuracy of the rotating laser is reduced.

In a particularly preferred manner, the temperature of the rotating laser is measured by means of an inclination sensor, which comprises a housing that is filled with a liquid and a gas bubble, a light source and at least one photo detector. The measurement of the temperature of the rotating laser by means of the inclination sensor of the leveling unit has the advantage that the temperature is measured exactly at the location in the device housing of the rotating laser that is relevant for orienting the vertical axis. In addition, no additional sensor element is required for temperature measurement, so that the equipment cost for the temperature measurement is reduced.

In a particularly preferred manner, an additional characteristic curve of temperatures and bubble lengths of the gas bubble is stored, the bubble length of the gas bubble is measured using the light source and the photo detector of the inclination sensor, and the temperature associated with the measured bubble length is determined using the additional characteristic curve. The gas bubble of the inclination sensor has a bubble length that is temperature-dependent and is thus suitable as a measured variable for the temperature. The bubble length can be measured using the light source and the photo detector of the inclination sensor. For the temperature measurement, no additional sensor element is required; the temperature is measured solely using the components of the inclination sensor.

In a preferred manner, a correction angle $\theta$ is calculated from the measurement distance $D_v$, the first height offset $H_1$ and the second height offset $H_2$, and the correction angle $\theta$ is stored as the new zero position for orienting the vertical axis in the defined vertical state when the difference $\Delta$ is greater than the maximum difference $\Delta_{max}$. The measurement distance between the rotating laser and the laser receiver was determined as a first distance, as a second distance or as an averaged distance, and is required for calibrating the vertical axis. If the difference $\Delta$ between the first and second control points is greater than the maximum difference $\Delta max$ defined by the device manufacturer, the rotating laser does not meet the indicated device accuracy and the vertical axis must be calibrated. The correction angle $\theta$ may be calculated according to the formula $\tan(\theta)=(H_1-H_2)/2D_v$.

In a particularly preferred manner, the calibrated vertical axis is checked in an additional check loop, wherein the vertical state of the vertical axis is defined by the new zero position. The device axes of the rotating laser (first and second horizontal axes and vertical axis) are oriented by means of the leveling device in their respective defined state and the method for checking the vertical axis is carried out. The distance between the first control point, which is determined in the first angular position, and the second control point, which is determined in the second angular position, is calculated as difference $\Delta$ and compared against the maximum difference $\Delta_{max}$. When the difference $\Delta$ is less than the maximum difference $\Delta_{max}$, the rotating laser meets the specified accuracy. In the event that the difference $\Delta$ is greater than the maximum difference $\Delta_{max}$ or equal to the maximum difference $\Delta_{max}$, an adjustment of the rotating laser is necessary.

Embodiments of the invention are described below using the drawing. It is not intended to necessarily depict the embodiments to scale; rather, the drawing, where useful for explanation's sake, is made in a schematic and/or slightly distorted form. One shall thereby take into account that diverse modifications and changes pertaining to the form and detail of a design may be undertaken, without departing from the general idea of the invention. The general idea of the invention is not restricted to the exact form or detail of the preferred design shown and described below, or restricted to a subject matter that would be restricted in comparison to the subject matter claimed in the claims. In regard to provided measurement ranges, values lying within the mentioned limits shall be disclosed as limit values and be arbitrarily usable and claimable. For the sake of simplicity, the same reference signs are used below for identical or similar parts, or parts with identical or similar functions.

DETAILED DESCRIPTION OF THE DRAWINGS

Figure 1:
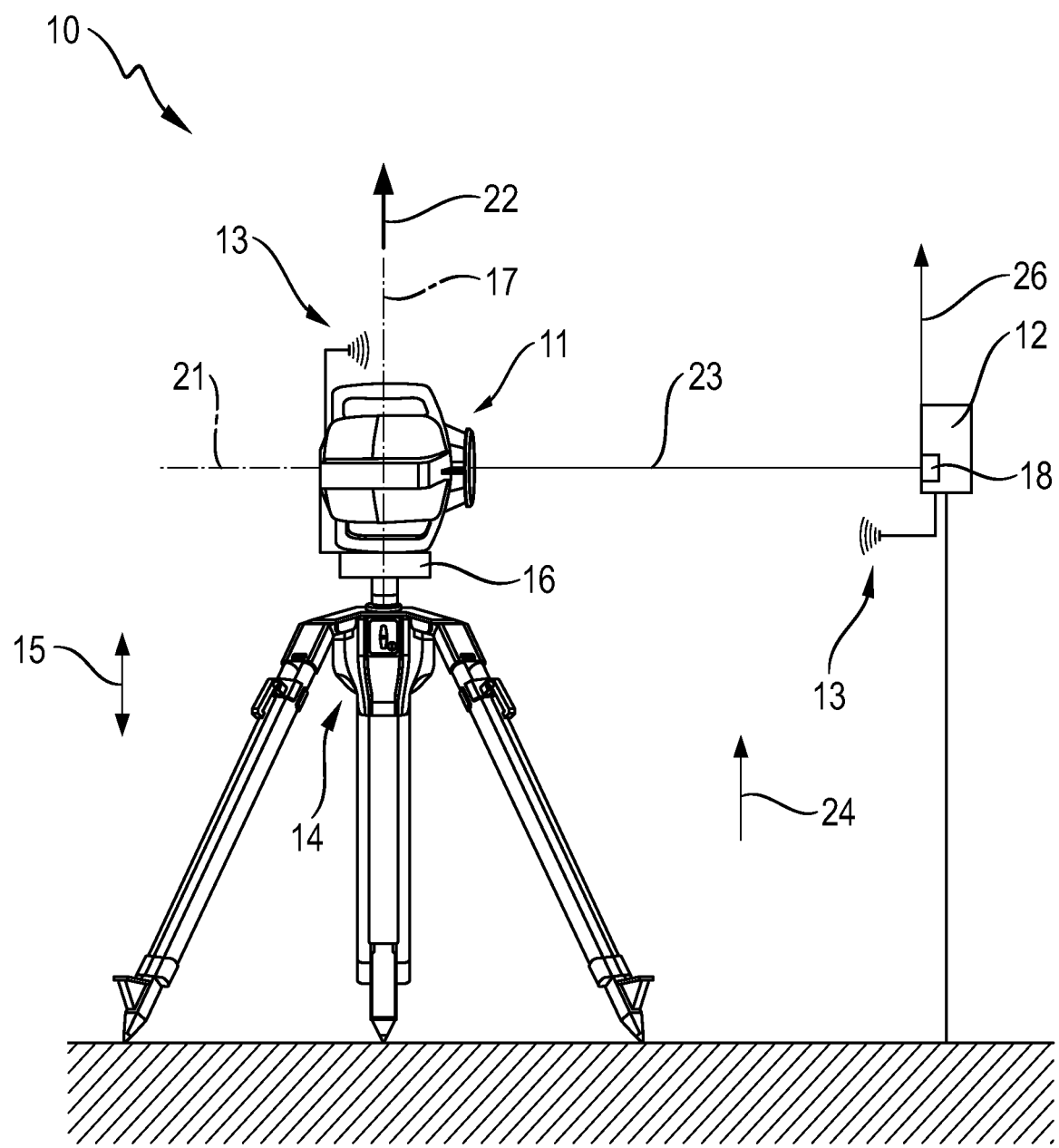
FIG. 1 illustrates a device with a rotating laser in a vertical position and a laser receiver in a transverse arrangement.

FIG. 1 depicts a device 10 with a rotating laser 11 and a laser receiver 12, which can be connected via a wireless communications link 13. Rotating laser 11 is oriented in a vertical position that is provided for vertical applications of the rotating laser. Rotating laser 11 is arranged by means of a vertical adapter on a motorized tripod 14, which allows an automatic height adjustment of rotating laser 11 in a height direction 15. In addition, a rotating platform 16 may be provided, which allows an automatic angle adjustment of rotating laser 11 about an axis of rotation 17 of the rotating platform 16. Rotating platform 16 can be integrated in tripod 14 or be designed as a separate component that is arranged on tripod 14. Laser receiver 12 is provided with a measuring function, which determines an incident position of a laser beam on a detection field 18 of laser receiver 12 and represents the distance of the laser beam to a zero position 19 of detection field 18.

Rotating laser 11 is designed as a horizontally and vertically usable rotating laser, which has a first laser beam 22 rotating about an axis of rotation 21 of rotating laser 11 and a stationary second laser beam 23. Rotating first laser beam 22 produces a laser plane, which is arranged perpendicular to axis of rotation 21, and second laser beam 23 runs perpendicular to the laser plane of first laser beam 22. The vertical position of rotating laser 11 shown in FIG. 1 utilizes second laser beam 23 and the beam is oriented at detection field 18 of laser receiver 12, wherein laser receiver 12 is oriented in a transverse arrangement.

The orientation of laser receiver 12 is defined by means of detection field 18 and a direction of gravity 24. Detection field 18 of laser receiver 12, with which the incident position of the first or second laser beam 22, 23 is captured, has in a longitudinal direction 25 a detection height $H_D$ and in a transverse direction 26 a detection width $B_D$. Longitudinal direction 25 corresponds to the measuring direction of laser receiver 12 and transverse direction 26 is oriented perpendicular to longitudinal direction 25, wherein the longitudinal and transverse direction 25, 26 run parallel to a top side of detection field 18. The longitudinal arrangement refers to the orientation of laser receiver 12, in which the longitudinal direction 25 of detection field 18 is oriented parallel to direction of gravity 24, and the transverse arrangement refers to the orientation of laser receiver 12, in which transverse direction 26 of detection field 18 is oriented parallel to direction of gravity 24.

Figure 2A:
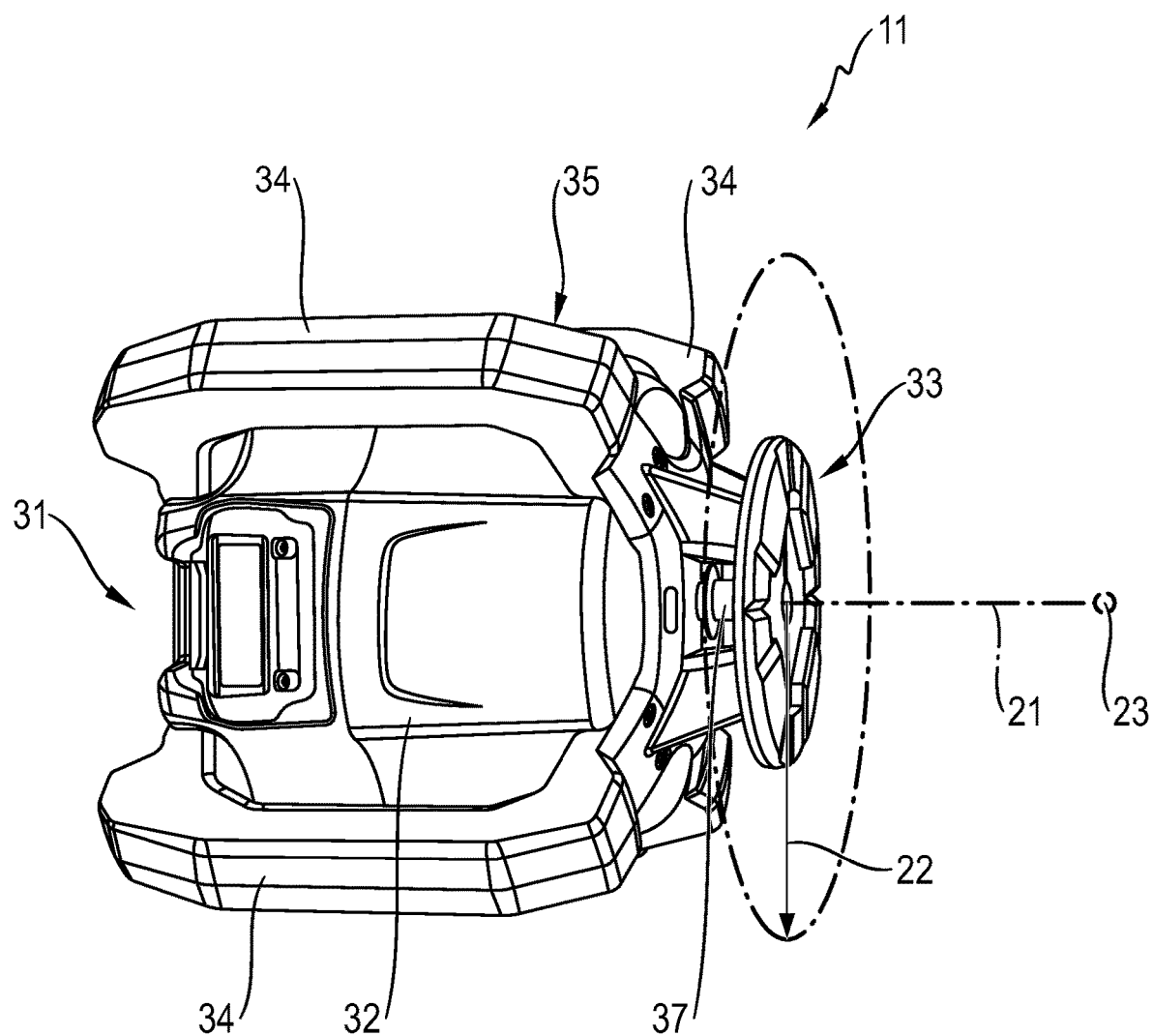
FIGS. 2A-C illustrate the rotating laser of FIG. 1 in a vertical position in a three-dimensional depiction (FIG. 2A) and the main components of the rotating laser in a schematic illustration in a first plane (FIG. 2B) and a second plane (FIG. 2C)
Figure 2A:
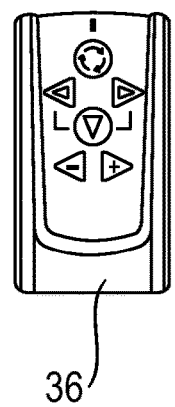
Figure 2B:
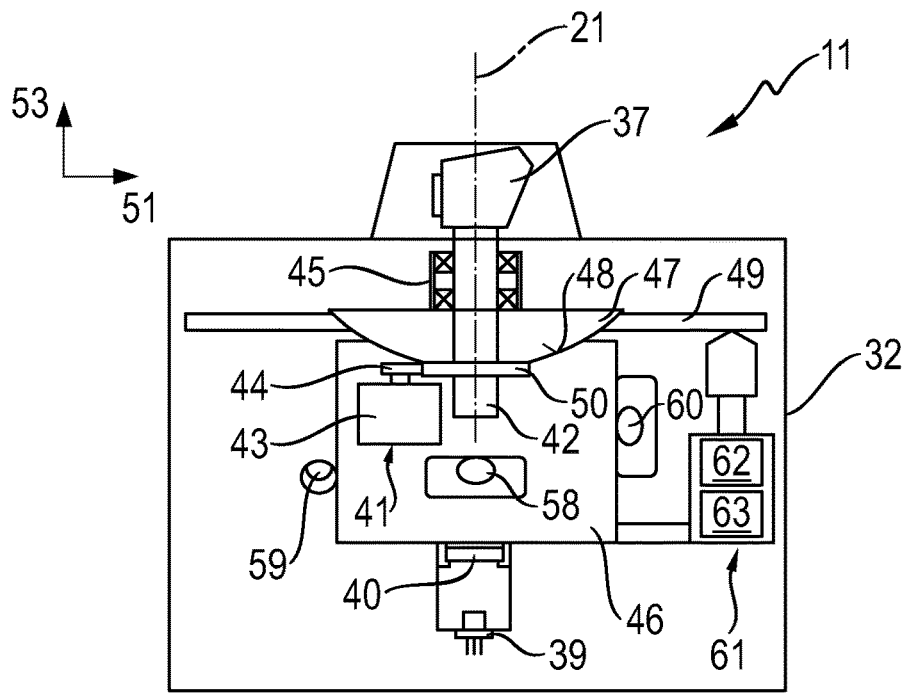
Figure 2C:
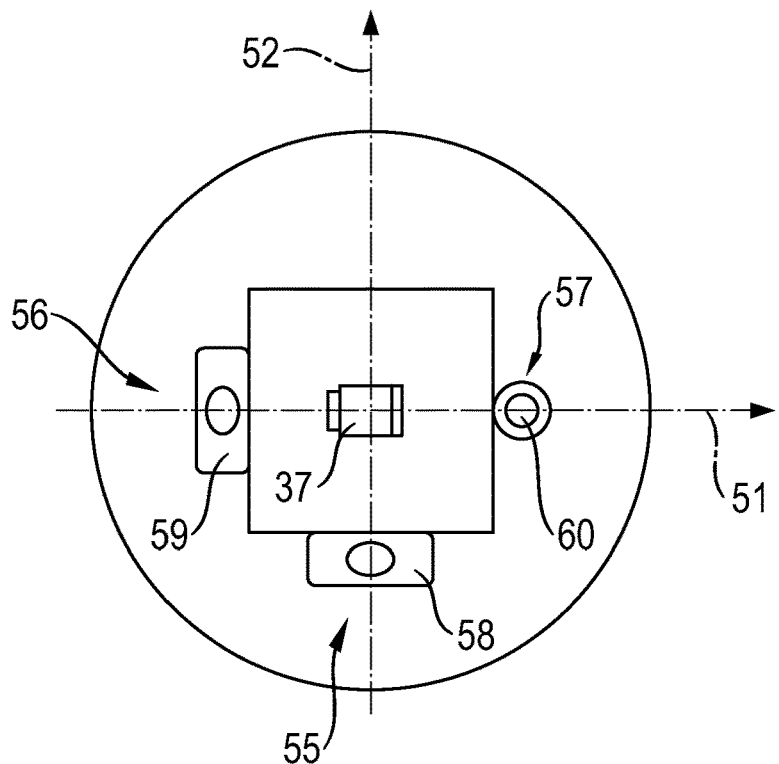

FIGS. 2A-C depict rotating laser 11 in a three-dimensional illustration in a vertical position (FIG. 2A) and the main components of rotating laser 11 in a schematic illustration, wherein FIG. 2B illustrates the components in a vertical plane parallel to rotation axis 21, and FIG. 2C illustrates the components in a horizontal plane perpendicular to rotation axis 21.

Rotating laser 11 comprises a device housing 31 and a measuring device arranged in device housing 31. Device housing 31 consists of a basic housing 32, a rotation head 33 and multiple handles 34. Rotating laser 11 is operated via an operating device 35, which is integrated in basic housing 32 and operable from the outside. Besides operating device 35 integrated in basic housing 32, a remote control 36 may be provided, which can be connected to rotating laser 11 via a communications link. The measuring device of rotating laser 11 produces within basic housing 32 a laser beam, which strikes deflection lens 37 rotating about axis of rotation 21. A first part of the laser beam is deflected 90° by deflection lens 37 and forms first laser beam 22 of rotating laser 11. A second part of the laser beam penetrates through deflection lens 37 and forms second laser beam 23 of rotating laser 11. A rotation mode, a line mode, and a point mode of rotating laser 11 are differentiated depending on the rotation speed at which first laser beam 22 is rotated about rotation axis 21.

FIGS. 2A-C depict rotating laser 11 in a three-dimensional illustration (FIG. 2A) and the main components of rotating laser 11 in a schematic illustration, wherein FIG. 2B illustrates the components in a vertical plane parallel to rotation axis 21 and FIG. 2C illustrates the components in a horizontal plane perpendicular to rotation axis 21.

Rotating laser 11 comprises a device housing 31 and a measuring device arranged in device housing 31. Device housing 31 consists of a basic housing 32, a rotation head 33 and multiple handles 34. Rotating laser 11 is operated via an operating device 35, which is integrated in basic housing 32 and operable from the outside. Besides operating device 35 integrated in basic housing 32, a remote control 36 may be provided, which can be connected to rotating laser 11 via a communications link. The measuring device of rotating laser 11 produces within basic housing 32 a laser beam, which strikes deflecting lens 37 rotating about axis of rotation 21. A first part of the laser beam is deflected 90° by deflection lens 37 and forms first laser beam 22 of rotating laser 11, which spans laser plane 38. A second part of the laser beam penetrates through deflection lens 37 and forms second laser beam 23 of rotating laser 11. A rotation mode, a line mode, and a point mode of rotating laser 11 are differentiated depending on the rotation speed at which first laser beam 22 is rotated about rotation axis 21.

FIGS. 2B, C depict the main components of rotating laser 11 in a schematic illustration. Rotating laser 11 comprises a laser device with a beam source 39, which produces a laser beam, and collimation lens 40. Beam source 39 is designed as a semiconductor laser for example, which produces the laser beam in the visible wavelength spectrum, for example a red laser beam having a wavelength of 635 nm or a green laser beam having a wavelength of 532 nm. After the laser beam leaves beam source 39, the laser beam is collimated using the collimation lens 40. Alternatively, the collimation lens may be integrated in the beam source, or for a beam source 39 having a high beam-quality and little divergence, the collimation lens may be omitted.

The collimated laser beam strikes deflection lens 37, which separates the first and second laser beams 22, 23. Deflection lens 37 is connected to a rotation device 41, which moves deflection lens 37 about axis of rotation 21. Rotation device 41 comprises a rotatable shaft 42, a motor unit 43, and a transmission device 44, which is designed in the form of a toothed belt and transmits the movement of motor unit 43 to shaft 42. Deflection lens 37 is coupled to rotatable shaft 42 and is designed to be rotatable about axis of rotation 21. Shaft 42 is seated in a pivot bearing 45 of a stator element 46, which is connected to a spherical cap 47. Spherical cap 47 is seated in a manner where it can be inclined about two pivot planes perpendicular to two rotation planes (plane perpendicular to axis of rotation 21) in a spherical cap 48 bearing in a housing-fitted installation frame 49. Rotating laser 11 comprises a measuring device 50, which measures the angle of rotation of shaft 42 during the rotation about axis of rotation 21. Measuring device 50 is designed for example as an angle encoder and consists of a graduated wheel that is non-rotatably connected to shaft 42, a scanning device with which the measuring disk is scanned, and an evaluation and control element.

Rotating laser 11 is designed as a horizontally and vertically usable rotating laser, wherein a horizontally and vertically usable rotating laser differs from a horizontally usable rotating laser due to an additional device axis. Rotating laser 11 has as device axes a first horizontal axis 51 and a second horizontal axis 52, which run vertically to each other and span a device plane. The first and second horizontal axes 51, 52 are displayed on rotation head 33 of rotating laser 11 via display elements. The horizontally and vertically usable rotating laser 11 has, besides the first and second horizontal axes 51, 52, an additional device axis, which is referred to as vertical axis 53 and is ideally oriented perpendicular to the device plane of the first and second horizontal axes 51, 52.

Rotating laser 11 is designed as a self-leveling rotating laser, which levels itself automatically when device housing 31 of rotating laser 11 is set up within a self-leveling range. The self-leveling range of rotating lasers is typically 5°. Rotating laser 11 comprises a leveling device, which orients the device axes of rotating laser 11 independently of an orientation of device housing 31 in a defined state. The leveling device comprises a first leveling unit 55 that orients first horizontal axis 51 in a first defined state, a second leveling unit 56 that orients second horizontal axis 52 in a second defined state, and a third leveling unit 57 that orients vertical axis 53 in a third defined state.

First leveling unit 55 comprises a first inclination sensor 58 and a first adjustment element, second leveling unit 56 comprises a second inclination sensor 59 and a second adjustment element, and third leveling unit 57 comprises a third inclination sensor 60 and a third adjustment element. The adjustment elements of leveling units 55, 56, 57 are integrated in inclination device 61, which has a first adjustment motor 62 and a second adjustment motor 63. First adjustment motor 62 inclines mounting frame 49 about a first pivot axis, which coincides with second horizontal axis 52, and the second adjustment motor 63 inclines mounting frame 49 about a second pivot axis, which coincides with first horizontal axis 51. First adjustment motor 62 forms the first adjustment element of first leveling unit 55 and second adjustment motor 63 forms the second adjustment element of second leveling unit 56. Since vertical axis 53 is oriented perpendicular to the horizontal plane of first and second horizontal axes 51, 52, the orientation of vertical axis 53 can be adjusted by means of first and second adjustment motors 62, 63. First and second adjustment motors 62, 63 jointly form the third adjustment element of third leveling unit 57.

The horizontal orientation of the laser plane or the device plane represents a preferred defined state, in which a rotating laser 11 is to be oriented in a horizontal position, wherein the horizontally oriented device plane is also referred to as a horizontal plane. The vertical orientation of the laser plane or the device plane represents a preferred defined state, in which a rotating laser 11 is to be oriented in a vertical position, wherein the vertically oriented device plane is also referred to as a vertical plane. Laser plane 38, which produces rotating first laser beam 22, can be inclined by means of inclination device 61 in relation to the horizontal plane or the vertical plane of rotating laser 11. Rotating laser 11 can incline the laser plane of rotating first laser beam 22 in an inclination direction or in two inclination directions. The inclination of the laser plane occurs in a leveled stated of rotating laser 11. Rotating laser 11 can be inclined in a horizontal position or in a vertical position.

Figure 3A:
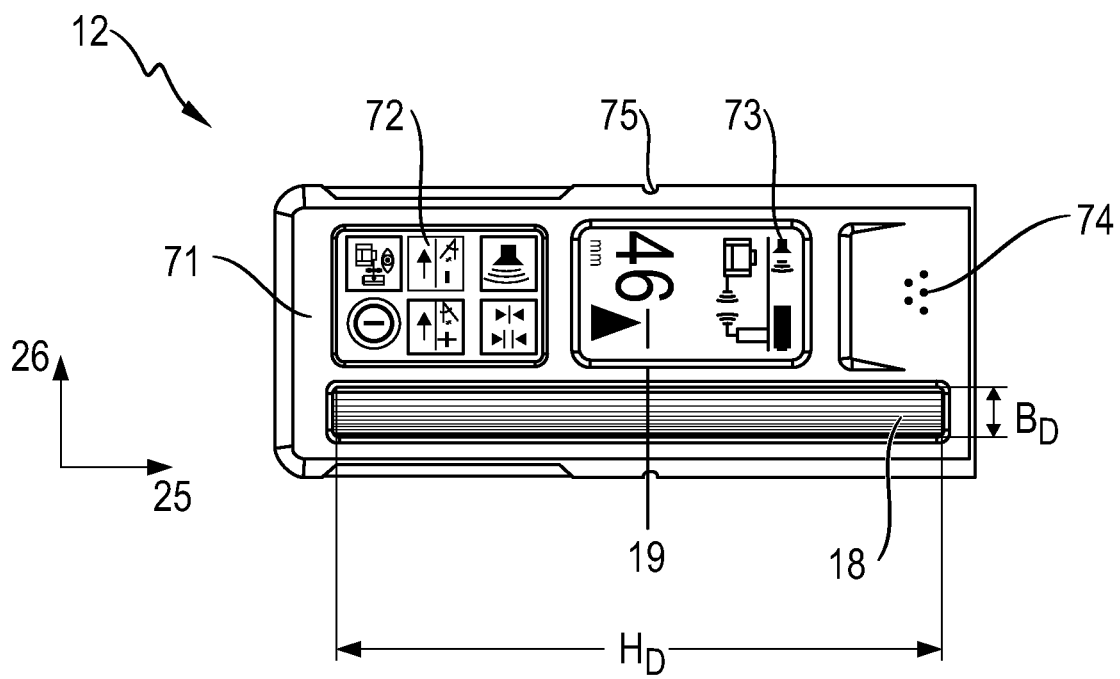
FIGS. 3A, B illustrate the laser receiver of FIG. 1 in a three-dimensional illustration (FIG. 3A) and the main components of the laser receiver and the rotating laser in a schematic illustration (FIG. 3B)
Figure 3B:
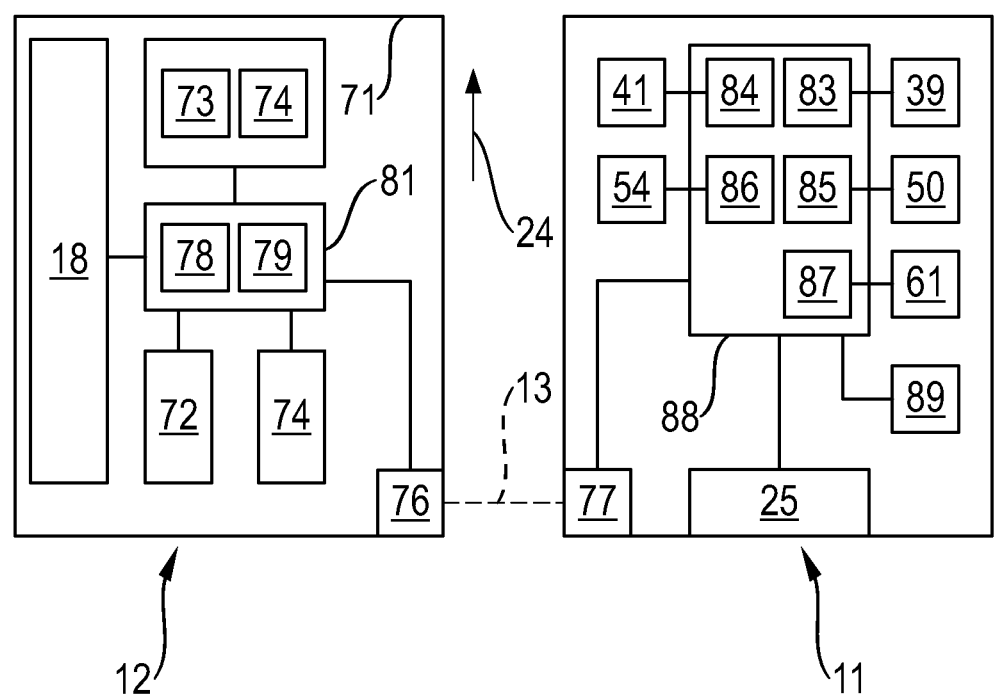

FIGS. 3A, B depict laser receiver 12 in a transverse arrangement in a three-dimensional illustration (FIG. 3A) and the main components of laser receiver 12 as well as the interaction with rotating laser 11 in a schematic illustration (FIG. 3B). Laser receiver 12 is provided with a measuring function, which determines the distance of a laser beam to zero position 19 of detection field 18.

Laser receiver 12 comprises a receiver housing 71, an operating device 72, an optic display 73, a speaker 74 and detection field 18, with which the incident position of a laser beam is captured. Detection field 18 has detection height $H_D$ in longitudinal direction 25 and detection width $B_D$ in transverse direction 26. Longitudinal direction 25 corresponds to the measuring direction of laser receiver 12 and transverse direction 26 is oriented perpendicular to longitudinal direction 25, wherein the longitudinal and transverse directions 25, 26 run parallel to detection field 18.

Operating device 72, optical display 73, speaker 74 and detection field 18 are integrated in receiver housing 71 of laser receiver 12. The operator can read information about laser receiver 12 via optical display 73.

The information includes for example a charge state of laser receiver 12, information about wireless communications link 13 to a rotating laser 11, and the adjusted volume of speaker 74. In addition, the distance of a laser beam to zero position 19 of laser receiver 12 can be indicated as a numerical value. As an alternative or in addition to the optical indication on optic display 73, the distance of the laser beam can be conveyed via speaker 74. Zero position 19 of detection field 18 is indicated on receiver housing 71 via marking notches 75.

FIG. 3B depicts the main components of laser receiver 12 and the interaction of laser receiver 12 with rotating laser 11 in the form of a block diagram. Communication between laser receiver 12 and rotating laser 11 occurs via communications link 13, which connects a first transmit/receive unit 76 in laser receiver 12 with a second transmit/receive unit 77 in rotating laser 11. First and second transmit/receive units 76, 77 are designed for example as radio modules and the communication between laser receiver 12 and rotating laser 11 occurs via a communications link 13 designed as a radio link.

Detection field 18, optical display 73 and speaker 74 are connected to an evaluation device 78, which is arranged inside receiver housing 71. Evaluation device 78 is connected to a control device 79 to control laser receiver 12, wherein evaluation device 78 and control device 79 are integrated in a control device 81 designed for example as a microcontroller. Laser receiver 12 also comprises a sensor module 82, which is arranged inside receiver housing 71 and is connected to control device 81. Using sensor module 82, an inclination of laser receiver 12 relative to direction of gravity 24 can be measured. Sensor module 82 comprises a 2-axis acceleration sensor or two 1-axle acceleration sensors.

The components of rotating laser 11, which are controlled by means of control elements or are connected to an evaluation element, include beam source 39, rotation device 41, measuring device 50 as well as leveling device 54, and if on hand inclination device 61. A first control element 83 for controlling beam source 39, a second control element 84 for controlling rotation device 41, an evaluation and control element 85 for measuring device 50, a third control element 86 for controlling leveling device 54 and a fourth control element 87 for controlling inclination device 61 can be designed as separate components, or as illustrated in FIG. 3B they can be integrated in a common control device 88, which is designed as a microcontroller for example. The control elements are connected via communication links to the components to be controlled of rotating laser 11.

Rotating laser 11 also comprises a temperature sensor 89, which is arranged in device housing 31 of rotating laser 11. Temperature sensor 89 measures the temperature in device housing 31 and transmits the temperature to control device 89 of rotating laser 11. Since the orientation of inclination sensors 58, 59, which orient first and second horizontal axes 51, 52 of rotating laser 11 in the horizontal state, are temperature-dependent and rotating laser 11 can be utilized in a large temperature range, for example between −20° C. and +50° C., it is advantageous if multiple zero positions v are stored in control device 88 of rotating laser 11. To do so, multiple first zero positions $v_1$ can be entered for first inclination sensor 58 as a function of the temperature and stored in a characteristic curve or table, multiple second zero positions $v_2$ can be entered for second inclination sensor 59 as a function of the temperature and stored in a characteristic curve or table, and multiple third zero positions $v_3$ can be entered for third inclination sensor 60 as a function of the temperature and stored in a characteristic curve or table. The zero position associated with the measured temperature is read from the characteristic curve or table, and the device axis is oriented in the vertical state defined by the zero position.

Figure 4A:
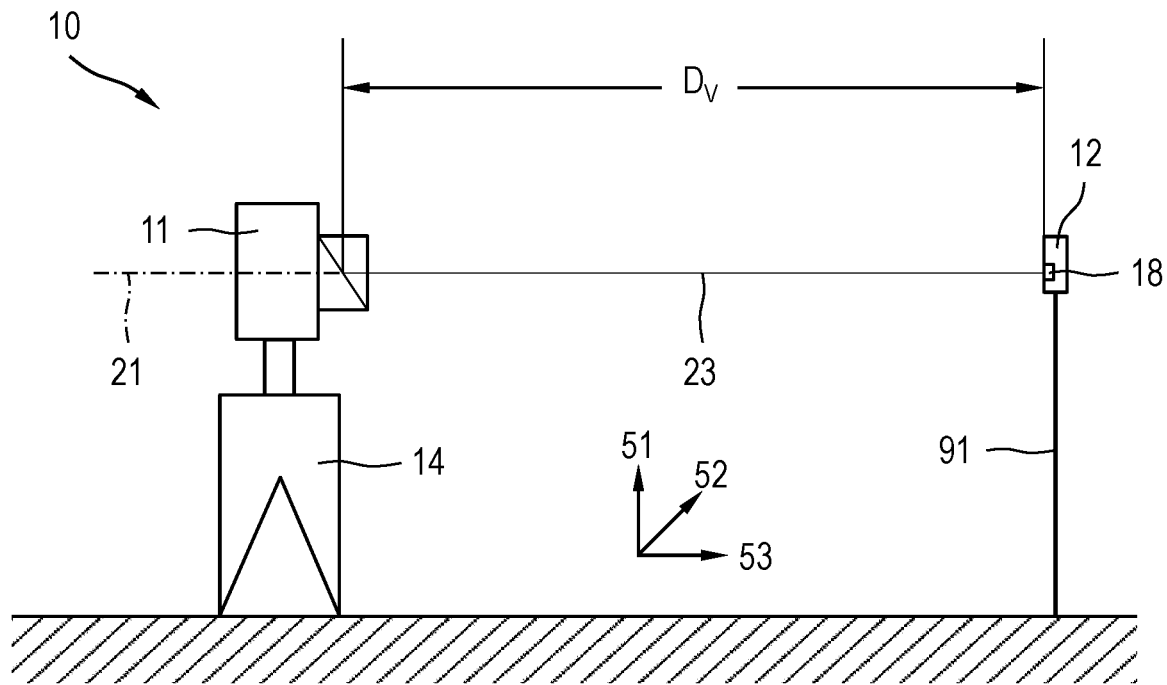
FIGS. 4A-C illustrate the rotating laser and the laser receiver of FIG. 1 in the embodiment of the method according to the invention for checking and calibrating a vertical axis of the rotating laser.
Figure 4B:
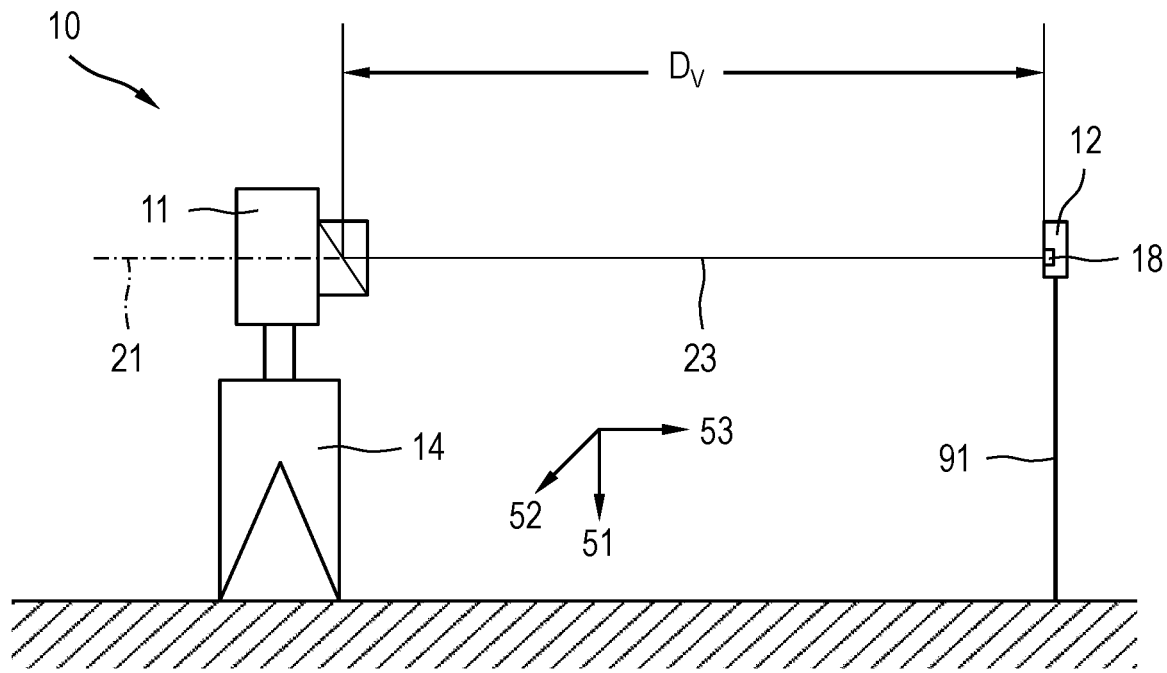
Figure 4C:
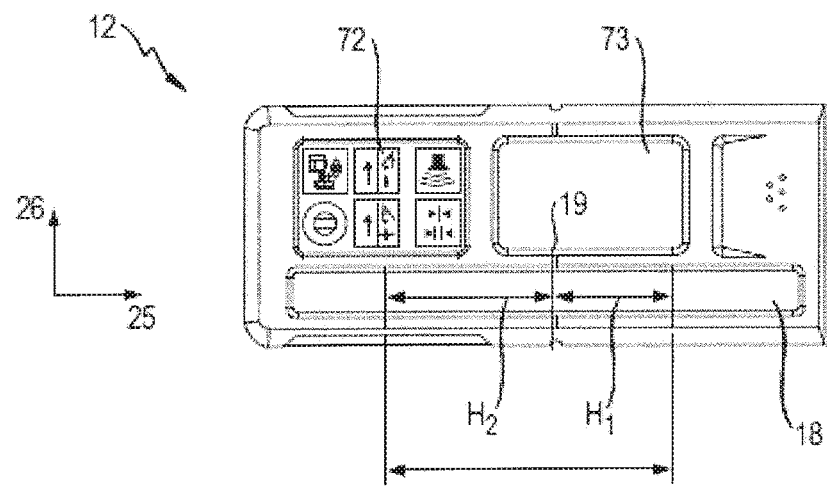

FIGS. 4A-C depict device 10 of FIG. 1 with rotating laser 11 and laser receiver 12 while executing the method according to the invention for checking and/or calibrating vertical axis 53 of rotating laser 11. FIG. 4A depicts rotating laser 11 in a first angular position, in which vertical axis 53 is oriented toward laser receiver 12; FIG. 4B depicts rotating laser 11 in a second angular position, which is rotated 180° about the axis of rotation in relation to the first angular position; and FIG. 4C depicts laser receiver 12 in a transverse arrangement with the incident position of second laser beam 23 in the first and second angular positions.

The method according to the invention for checking and/or calibrating a vertical axis is executed in a vertical position of rotating laser 11 and in a transverse arrangement of laser receiver 12. Rotating laser 11 is set up in a vertical position on tripod 14 or on a stable substrate at a measurement distance $D_v$ to laser receiver 12, wherein measuring distance $D_v$ is measured between the center of deflection lens 37 of rotating laser 11 and the top side of detection field 18 of laser receiver 12; the center of deflection lens 37 coincides with rotation axis 21 of rotating laser 11. Using tripod 14 has the advantage that the method according to the invention is executed at a height at which temperature fluctuations are less than on the ground. Laser receiver 12 is attached to a stationary wall, a mobile wall or a measuring staff 91.

To adjust the vertical position of rotating laser 11, first horizontal axis 51, second horizontal axis 52 and vertical axis 53 are oriented in a defined vertical state, wherein the vertical state of first horizontal axis 51 is established by a first zero position $v_1$ of first inclination sensor 58, the vertical state of second horizontal axis 52 by a second zero position $v_2$ of second inclination sensor 59, and the vertical state of vertical 53 by a third zero position $v_3$ of third inclination sensor 60. First horizontal axis 51 is oriented by means of first leveling unit 55 in first zero position v1, second horizontal axis 52 is oriented by means of second leveling unit 56 in second zero position v2, and vertical axis 53 is oriented by means of third leveling unit 57 in third zero position v3. Stored in control device 89 of rotating laser 11 are first zero position $v_1$ for first inclination sensor 58, second zero position $v_2$ for second inclination sensor 59, and third zero position $v_3$ for third inclination sensor 60.

To check vertical axis 53, rotating laser 11 is arranged consecutively in a first and second angular position, which differ from each other by 180°. Rotating laser 11 can be oriented into the angular positions using rotation platform 16 or manually by the operator. Rotating laser 11 is arranged in the first angular position (FIG. 4A), wherein vertical axis 53 is oriented in the first angular position toward detection field 18 of laser receiver 12. The incident position of second laser beam 23 on detection field 18 of laser receiver 12 is determined by evaluation device 78 of laser receiver 12 as a first control point 92, and the distance of first control point 92 to zero position 19 of detection field 18 is stored as first height offset $H_1$(FIG. 4C). Rotating laser 11 is oriented from the first angular position by 180° about axis of rotation 21 into the second angular position (FIG. 4B). In the second angular position, vertical axis 53 is oriented in the opposite axis direction toward detection field 18 of laser receiver 12. The incident position of second laser beam 23 on detection field 18 of laser receiver 12 is determined by evaluation device 78 of laser receiver 12 as a second control point 93, and the distance of second control point 93 to zero position 19 of detection field 18 is stored as second height offset $H_2$(FIG. 4C).

Evaluation device 78 of laser receiver 12 calculates the distance between first control point 92 and second control point 93 as difference Δ from first and second height offsets $H_1$, $H_2$. As described, the evaluation can be performed by evaluation device 78 of laser receiver 12. Alternatively, the evaluation can be performed by a corresponding component in rotating laser 11 or an additional component. If the evaluation is not performed by evaluation device 78 of laser receiver 12, first and second control points 92, 93 or difference Δ are transmitted via a communications link to the corresponding component.

Evaluation device 78 of laser receiver 12 calculates from difference Δ=H1−H2 and measurement distance $D_v$ between rotating laser 11 and laser receiver 12 a relative deviation $\Delta/D_v$ and compares the relative deviation $\Delta/D_v$ against an established relative maximum deviation $\Delta_{max}/D_v$. Alternatively, from the relative maximum deviation $\Delta_{max}/D_v$ and measuring distance $D_v$, a maximum deviation Δmax can be calculated and the difference Δ can be compared against maximum deviation $\Delta_{max}$. If the relative deviation Δ/D is greater than the relative maximum deviation or difference Δ is great than maximum deviation $\Delta_{max}$, calibration of vertical axis 53 is required. Evaluation device 78 calculates from first height offset $H_1$, second height offset $H_2$ and measurement distance $D_v$ a correction angle θ, which is stored as a new third zero position for orienting vertical axis 53 in the vertical state. Correction angle θ can be calculated according to the formula $\tan(\theta)=(H_1+H_2)/2D_v$.

Measurement distance $D_v$ between rotating laser 11 and laser receiver 12 is determined in a first and/or second measuring procedure by means of rotating laser 11 and laser receiver 12. In doing so, measurement distance $D_v$ between rotating laser 11 and laser receiver 12 can be determined at different times when executing the method according to the invention for checking and/or calibrating vertical axis 53. Measurement distance $D_v$ can be determined as first distance $d_1$ by means of a first measuring procedure, as second distance $d_2$ by means of a second measuring procedure, or as distance d averaged from first and second distances $d_1$, $d_2$. In doing so, first and second distance $d_1$, $d_2$ are determined in a vertical position of rotating laser 11 and transverse arrange of laser receiver 12.

In the second measuring procedure, second laser beam 23 is moved at a constant speed $v_R$ of first or second adjustment motors 62, 63. The second measuring procedure comprises the method steps: Rotating laser 11 is oriented in the defined state and second laser beam 22 is moved at a constant speed $v_R$. Evaluation device 78 of laser receiver 12 determines a signal length $t_s$ of second laser beam 23 on detection field 18 of laser receiver 12. Second distance $d_2$ can be calculated from speed $v_R$ of second laser beam 23, signal length $t_s$ of second laser beam 23 and detection width $B_D$ of detection field 18 according to $t_s/t_{full}=B_D/(2\pi d_2)$ where $t_{full}=60/v_R$. Speed $v_R$ is provided in revolutions per minute and time $t_{full}$ required for one revolution is $60/v_R$.

Figures 5A, 5B:
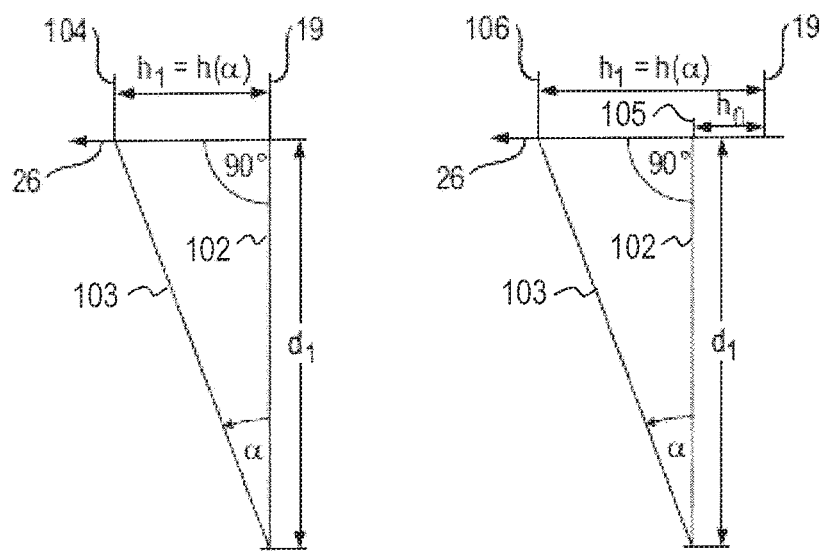
FIGS. 5A-C illustrate three variants of a first measuring procedure for measuring a first distance between the rotating laser and the laser receiver by means of an inclined laser beam.
Figure 5C:
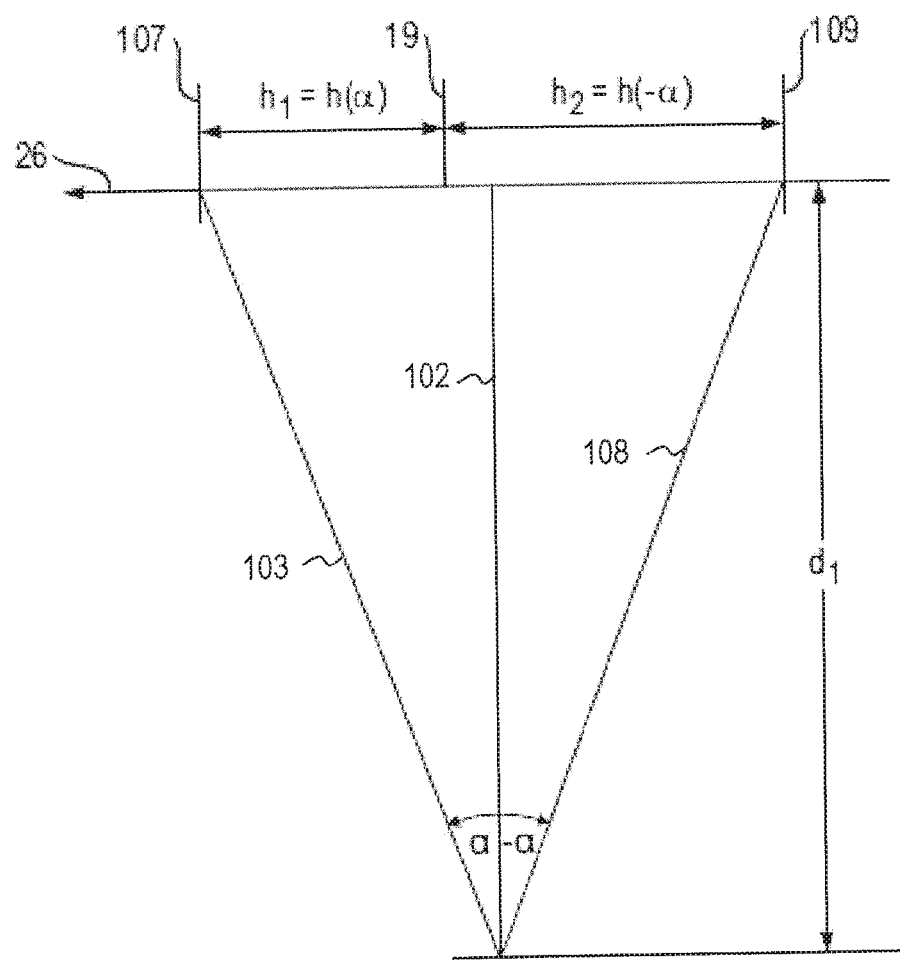

FIGS. 5A-C depict three variants of the first measuring procedure, with which measurement distance $D_v$ between rotating laser 11 and laser receiver 12 as first distance $d_1$ is determined. Laser receiver 12 is oriented parallel to direction of gravity 24 and first distance $d_1$ is measured between axis of rotation 21 of rotating laser 11 and a front side 101 of detection field 18 of laser receiver 12. At the start of the first measuring procedure, horizontal axes 51, 52 of rotating laser 11 are in a vertical state or are oriented into a vertical state. Rotating laser 11 projects a vertically oriented laser beam 102.

Laser beam 102 is inclined by a known inclination angle α and the incident position of the inclined laser beam on detection field 18 of laser receiver 12 is determined as a measuring point and the distance from the measuring point to the zero position is stored as a height. The laser beam can thereby be inclined using leveling device 54 or inclination device 61. The use of leveling device 54 has the advantage that first distance d1 can also be determined by rotating lasers 11 without an inclination device 61. The first measuring procedure requires that rotating laser 11 is oriented to laser receiver 12 in such a manner that the inclination direction runs approximately perpendicular to detection field 18 of laser receiver 12. Deviations from the perpendicular orientation result in measurement errors that are tolerable for small deviations.

FIG. 5A depicts the first variant of the first measuring procedure. Vertically oriented laser beam 102 is adjusted to zero position 19 of laser receiver 12. The laser beam is then inclined using the corresponding leveling unit of leveling device 54 or inclination device 61 by inclination angle α. The incident position of inclined laser beam 103 on detection field 18 of laser receiver 12 is determined as first measuring point 104 and the distance of first measuring point 104 to zero position 19 is stored as first height $h_1=h(\alpha)$. First distance d1 can be calculated from inclination angle α and the height difference between the first height ($h_1=h(\alpha)$) and zero position 19 of detection field 18. When zero position 19 corresponds to a height of 0 mm, first distance d1 can be calculated according to $\tan(\alpha)=h(\alpha)/d_1$.

FIG. 5B depicts the second variant of the first measuring procedure. Vertically oriented laser beam 102 is projected to detection field 18 of laser receiver 12. The incident position of laser beam 102 on detection field 18 is determined as reference point 105 and the distance to reference point 105 to zero position 19 is stored as reference height $h_0=h(0°)$. The laser beam is then inclined by inclination angle α and the incident position of inclined laser beam 103 on detection field 18 is determined as first measuring point 106 and the distance of first measuring point 106 to zero position 19 is stored as first height $h_1=h(\alpha)$. First distance $d_1$ can be calculated from inclination angle α and the height difference between the first height $h_1=h(\alpha)$ and the reference height $h_0=h(0°)$ according to $\tan(\alpha)=(h_1-h_0)/d_1$.

FIG. 5C depicts the third variant of the first measuring procedure. The vertically oriented laser beam 102 is inclined in a positive inclination direction by inclination angle α. The incident position of inclined laser beam 103 on detection field 18 is determined as first measuring point 107 and the distance of first measuring point 107 to zero position 19 is stored as first height $h_1=h(+\alpha)$. Subsequently, the laser beam is inclined to negative inclination direction, opposite the positive inclination direction, by a negative inclination angle −α. The incident position of inclined laser beam 108 on detection field 18 is determined as second measuring point 109 and the distance of second measuring point 109 to zero position 19 is stored as second height $h_2=h(-\alpha)$. First distance $d_1$ can be calculated from inclination angle α and the height difference between the first height $h_1=h(+\alpha)$ and the second height $h_2=h(-\alpha)$ according to $\tan(2\alpha)=(h(+\alpha)-h(-\alpha))/d_1$.

The formulas to calculate measurement distance $D_v$ between rotating laser 11 and laser receiver 12 and the formulas to calculate correction angle θ when calibrating vertical axis 53 apply to a laser receiver 12, which is oriented parallel to direction of gravity 24. To correct measuring errors due to a non-plumb orientation of laser receiver 12, laser receiver 12 comprises sensor module 82, with which the inclination of laser receiver 12 is measured relative to direction of gravity 24.

Figure 6A:
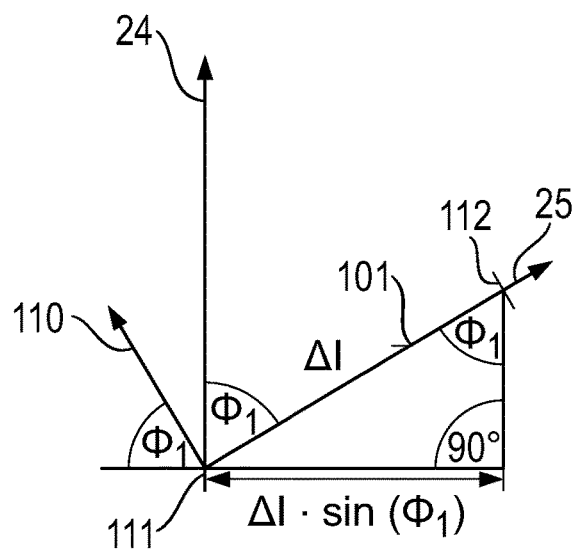
FIGS. 6A, B illustrate the laser receiver, which is inclined to a direction of gravity by a first vertical angle (FIG. 6A) and a second vertical angle (FIG. 6B), in a schematic illustration.
Figure 6B:
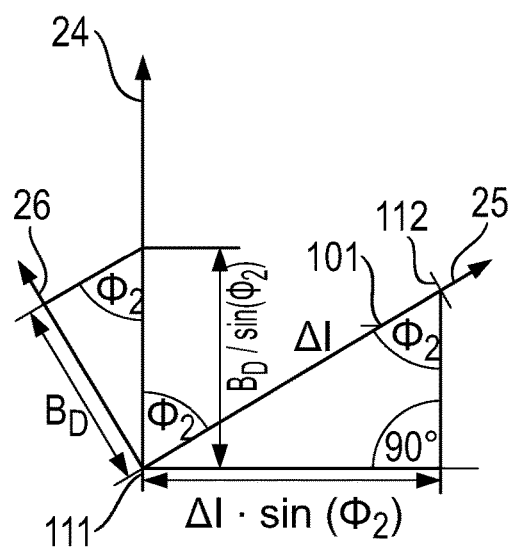

FIGS. 6A, B depict the orientation of laser receiver 12 in a schematic illustration, wherein laser receiver 12 may be inclined to direction of gravity 24 by a first vertical angle $\varphi_1$ and/or a second vertical angle $\varphi_2$. FIG. 6A thereby depicts laser receiver 12, which is inclined in a first vertical plane by first vertical angle $\varphi_1$, and FIG. 6B depicts laser receiver 12, which is inclined in a second vertical plane by a second vertical angle $\varphi_2$. The first vertical plane is spanned by direction of gravity 24 and a perpendicular vector 110 of detection field 18, and the second vertical plane is spanned by longitudinal direction 25 and transverse direction 26 of detection field 18. First vertical angle $\varphi_1$ is measured between perpendicular vector 110 and direction of gravity 24, wherein first vertical angle $\varphi_1$ represents a deviation of 90°, and second vertical angle $\varphi_2$ is measured between direction of gravity 24 and longitudinal direction 25 of detection field 18.

A first laser beam strikes detection field 18 of laser receiver 12 and produces a first incident position 111. A second laser beam strikes detection field 18 of laser receiver 12 and produces a second incident position 112. Evaluation device 78 of laser receiver 12 calculates a distance ΔI between first incident position 111 and second incident position 112. In the method for checking and/or calibrating a vertical axis, distance ΔI corresponds to the difference Δ from the first height offset $H_1$ and second height offset $H_2$, and in the distance measurement using the first measuring procedure, distance ΔI corresponds to height difference Δh between first height $h_1$ and second height $h_2$.

If laser receiver 12 is inclined by first vertical angle $\varphi_1$, horizontal distance $v_1$ perpendicular to direction of gravity 24 in the first vertical plane is smaller than distance $\Delta I$, which detection field 18 of laser receiver 12 measured (FIG. 6a). For horizontal distance $v_1$, $\Delta I*\cos(90°-\varphi_1)=\Delta I*\sin(\varphi_1)$. If laser receiver 12 is inclined by second vertical angle $\varphi_2$, horizontal distance $v_2$ perpendicular to direction of gravity 24 in the second vertical plane is smaller than distance $\Delta I$, which detection field 18 of laser receiver 12 measured (FIG. 6B). For horizontal distance $v_2$, the correlation is $\Delta I*\cos(90°-\varphi_2)=\Delta I*\sin(\varphi_2)$. When laser receiver 12 is inclined in relation to direction of gravity 24 by first vertical angle $\varphi_1$ and second vertical angle $\varphi_2$, the horizontal distance perpendicular to direction of gravity 24 is found by the formula $\Delta I*\cos(90°-\varphi_1)*\cos(90°-\varphi_2)=\Delta I*\sin(\varphi_1)*\sin(\varphi_2)$. In the formulas that use the measuring function of laser receiver 12 and measure distances $\Delta I$ on detection field 18, the distances $\Delta I$ are multiplied by a correction factor $\cos(90°-\varphi_1)*\cos(90°-\varphi_2)=\sin(\varphi_1)*\sin(\varphi_2)$. The correction factor $\cos(90°-\varphi_1)*\cos(90°-\varphi_2)$ is to be taken into account in the distance measurement of first distance $d_1$ using the first measuring procedure when determining difference $\Delta$ between first and second control points 92, 93 and calculating correction angle $\theta$ within the scope of the method according to the invention.

Second vertical angle $\varphi_2$ should also be taken into account in calculating second distance $d_2$ by means of second measuring procedure. By inclining laser receiver 12 by second vertical angle $\varphi_2$, the vertical distance in direction of gravity 24, which second laser beam 23 passes over on detection field 18, is greater than detection width $B_D$ of detection field 18 in transverse direction 26. The signal length of second laser beam 23 corresponds to the vertical distance in direction of gravity 24 on detection field 18. For the vertical distance, the correlation is $B_D/\cos(90°-\varphi_2)-BD/\sin(\varphi_2)$. An inclination of laser receiver 12 by first vertical angle $\varphi_1$ does not change the vertical distance, which second laser beam 23 passes over on detection field 18.

Figure 7A:
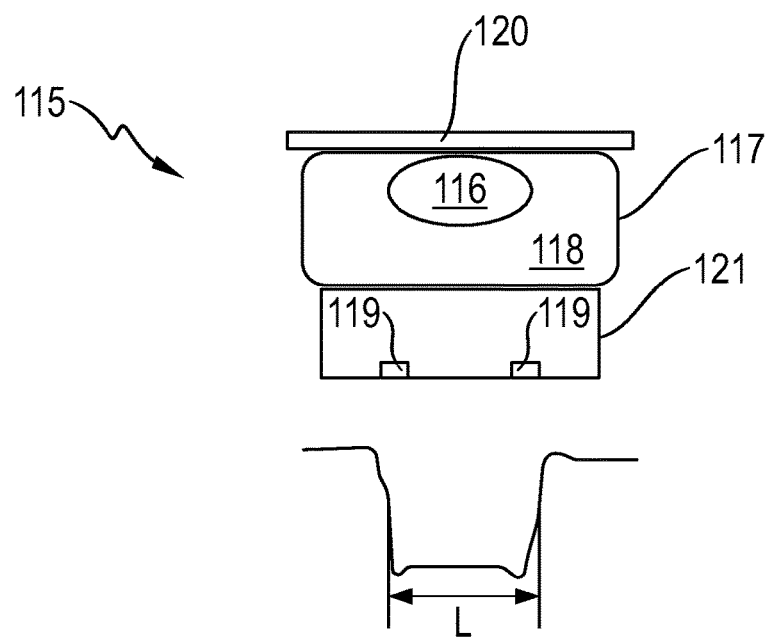
FIGS. 7A-C illustrate the setup of an optical inclination sensor with a gas bubble (FIG. 7A), a characteristic curve that represents a zero position of the inclination sensor as a function of a temperature (FIG. 7B), and another characteristic curve that represents the temperature as a function of a bubble length of the gas bubble (FIG. 7C).
Figure 7B:
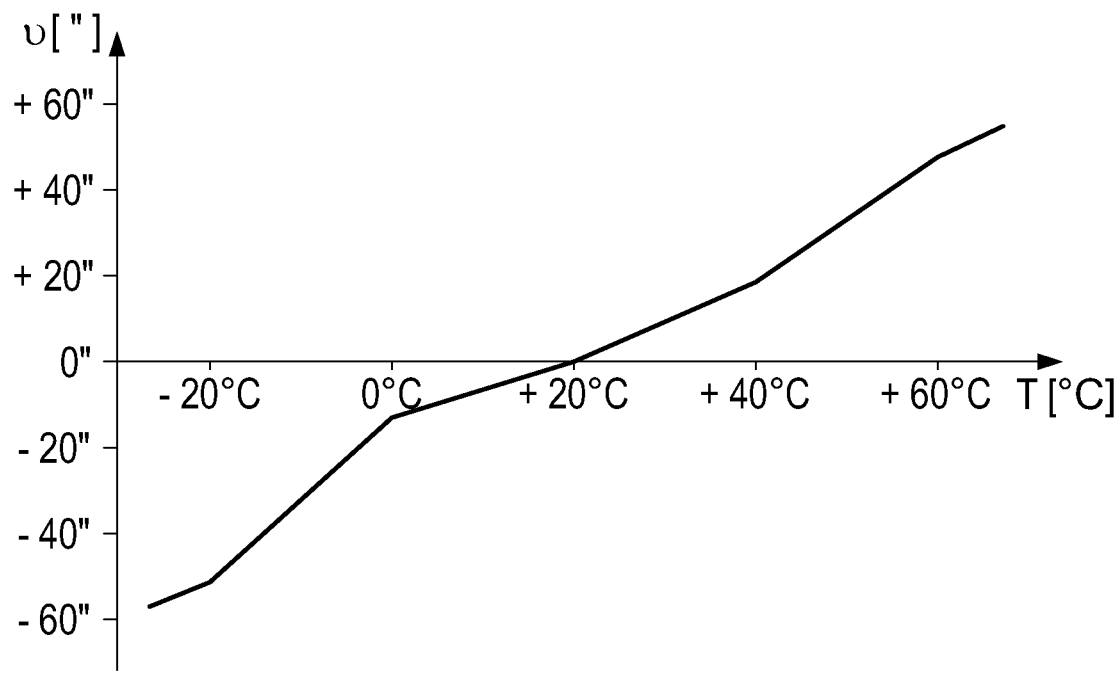
Figure 7C:
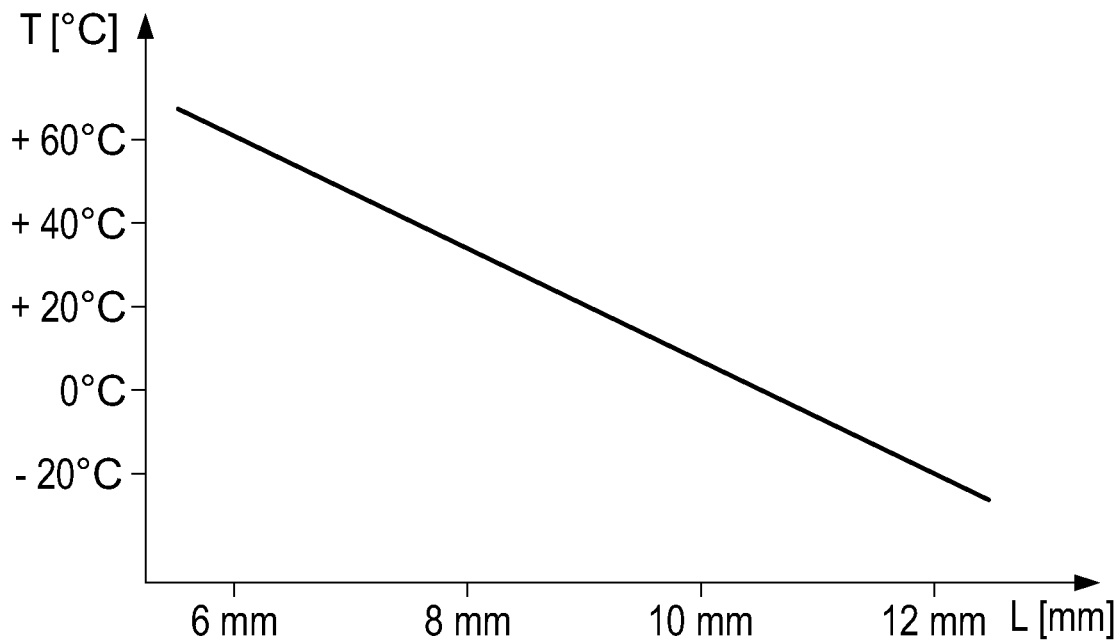

FIGS. 7A-C depict the setup of an optical inclination sensor 115 having a gas bubble 116 (FIG. 7A), a characteristic curve that represents the zero position $v$ of inclination sensor 115 as a function of a temperature T (FIG. 7B), and another characteristic curve that represents temperature T as a function of a bubble length L of gas bubble 116 (FIG. 7C).

For outdoor applications of rotating laser 11, sunrays may result in temperature fluctuations in device housing 31 of rotating laser 11, so that the measured temperature depends on the position of temperature sensor 89 in device housing 31. To reduce measurement errors in the temperature measurement, the temperatures of inclination sensors 58, 59, 60 can be measured. The temperature of first inclination sensor 58 is referred to as first temperature $T_1$, the temperature of second inclination sensor 59 as second temperature $T_2$, and the temperature of the third inclination sensor 60 as third temperature $T_3$. Temperature measurements using inclination sensors 58, 59, 60 have the advantage that temperatures $T_1$, $T_2$, $T_3$ are measured exactly at the location in device housing 31, which is relevant for orienting device axes 51, 52, 53.

FIG. 7A depicts the components of inclination sensor 115, whose structure corresponds to inclination sensors 58, 59, 60 of rotating laser 11. Inclination sensor 115 comprises a housing 117, which is filled with gas bubble 116 and a liquid 118, a light source 119, a photo detector 120, and a spacer 121. Gas bubble 116 has a bubble length L, which is temperature-dependent and thus suitable as a measurement variable for temperature T. Bubble length L of gas bubble 116 can be measured using light source 119 and photo detector 120. To differentiate between the first, second, and third inclination sensors 58, 59, 60, the components are provided with an index, which is separated by a hyphen from the reference sign. First inclination sensor 58 has index "1", second inclination sensor 59 has index "2", and third inclination sensor 60 has index "3".

FIG. 7B depicts a characteristic curve that represents zero position $v$ of inclination sensor 115 as a function of temperature T. The characteristic curve produces for the approved temperature range of rotating laser 11 from $-20°$ C. to $+50°$ C. a relationship between the temperature of inclination sensor 115 and zero position $v$ of inclination sensor 115, which corresponds to the orientation in the defined state of inclination sensor 115. In control device 89 of rotating laser 11, there is stored a first characteristic curve representing first zero position $v_1$ of first inclination sensor 58 as a function of first temperature $T_1$, a second characteristic curve representing second zero position $v_2$ of second inclination sensor 59 as a function of second temperature $T_2$, and a third characteristic curve representing third zero position $v_3$ of third inclination sensor 60 as a function of third temperature $T_3$.

FIG. 7C depicts another characteristic curve, which represents temperature T as a function of bubble length L of gas bubble 116. The characteristic curve produces for the approved temperature range of rotating laser 11 from $-20°$ C. to $+50°$ C. a relationship between the temperature T of inclination sensor 115 and bubble length L of gas bubble 116. Bubble length L of gas bubble 116 changes linearly with temperature T of inclination sensor 115, wherein bubble length 11 decreases as temperature T drops. In control device 89 of rotating laser 11, there is stored an additional first characteristic curve representing first temperature $T_1$ as a function of first bubble length $L_1$ of first gas bubble 116-1, an additional second characteristic curve representing second temperature $T_2$ as a function of second bubble length $L_2$ of second gas bubble 116-2, and an additional third characteristic curve representing third temperature $T_3$ as a function of third bubble length $L_3$ of third gas bubble 116-3.

Alternatively, the characteristic curve, which represents zero position $v$ of inclination sensor 115 as a function of temperature T, can be replaced by a characteristic curve that represents zero position $v$ of inclination sensor 115 as a function of bubble length L of gas bubble 116. In this case, there is in control device 89 of rotating laser 11 a first characteristic curve that represents first zero position $v_1$ of first inclination sensor 58 as a function of first bubble length $L_1$ of first gas bubble 116-1, a second characteristic curve representing second bubble length $v_2$ of second inclination sensor 59 as a function of second bubble length $L_2$ of second gas bubble 116-2, and a third characteristic curve representing third bubble length $v_3$ of third inclination sensor 60 as a function of third bubble length $L_3$ of third gas bubble 116-3.

The invention claimed is:

1. A method for checking and/or calibrating a vertical axis (53) of a rotating laser (11), which projects a first laser beam (22) rotatable about an axis of rotation (21) and a stationary second laser beam (23), comprising the steps of:
   positioning the rotating laser (11) at a measurement distance (Dv) to a laser receiver (12), wherein the rotating laser (11) is oriented in a vertical position and the laser receiver (12) is positioned in a transverse arrangement;
   orienting the device axes (51, 52, 53) of the rotating laser (11), which are a first horizontal axis (51), a second horizontal axis (52), and the vertical axis (53), in a defined state, wherein the defined state is established by a first zero position (v1) for the first horizontal axis (51), a second zero position (v2) for the second horizontal axis (52), and a third zero position (v3) for the vertical axis (53);

arranging the rotating laser (11) in a first angular position, wherein the vertical axis (53) is oriented in the first angular position on a detection field (18) of the laser receiver (12);

determining an incident position of the second laser beam (23) on the detection field (18) of the laser receiver (12) as a first control point (92) and storing a distance of the first control point 92) to a zero position (19) of the detection field (18) as a first height offset (H1);

arranging the rotating laser (11) in a second angular position, wherein the second angular position is rotated 180° in relation to the first angular position about the axis of rotation (21) of the rotating laser (11);

determining the incident position of the second laser beam (23) on the detection field (18) of the laser receiver (12) as a second control point (93) and storing a distance of the second control point (93) to the zero position (19) of the detection field (18) as a second height offset (H2);

calculating a distance between the first control point (92) and the second control point (93) as a difference (Δ=H1−H2) from the first and the second height offsets (H1, H2);

determining the measurement distance (Dv) between the rotating laser and the laser receiver (12); and comparing the difference (Δ) against a maximum difference (Δmax).

2. The method according to claim 1, wherein the measurement distance (Dv) between the rotating laser (11) and the laser receiver (12) is determined by the second laser beam (23) and the laser receiver (12).

3. The method according to claim 2, wherein the measurement distance (Dv) between the rotating laser (11) and the laser receiver (12) is determined as a first distance (d1) using a first measuring procedure, as a second distance (d2) using a second measuring procedure, or as a distance (d) averaged from the first and the second distances (d1, d2).

4. The method according to claim 3, wherein the rotating laser (11) is oriented vertically, a vertically oriented laser beam (102) is adjusted to the zero position (19) of the detection field (18), the vertically oriented laser beam is inclined in a direction of the laser receiver (12) at an inclination angle (a), an incident position of the inclined laser beam (103) on the detection field (18) of the laser receiver (12) is determined as a first measuring point (104), a distance of the first measuring point (104) to the zero position (19) of the detection field (18) is stored as a first height (h1=h(α)), and the first distance (d1) is calculated from the inclination angle (α) and a height difference (Δh) between the first height (h1=h(α)) and the zero position (19) of the detection field (18).

5. The method according to claim 3, wherein the rotating laser (11) is oriented vertically, an incident position of a vertically oriented laser beam (102) on the detection field (18) of the laser receiver (12) is determined as a reference point (105), a distance of the reference point (105) to the zero position (19) of the detection field (18) is stored as a reference height (h0), the vertically oriented laser beam is inclined at an inclination angle (α), an incident position of the inclined laser beam (103) on the detection field (18) of the laser receiver (12) is determined as a first measuring point (106), a distance of the first measuring point (106) to the zero position (19) of the detection field (18) is stored as a first height (h1=h(α)), and the first distance (d1) is calculated from the inclination angle (α) and a height difference (Δh=h1−h0) between the first height (h1) and the reference height (h0).

6. The method according to claim 3, wherein the rotating laser oriented vertically, a vertically oriented laser beam (102) is inclined in an inclination direction at an inclination angle (α), an incident position of the inclined laser beam (103) on the detection field (18) of the laser receiver (12) is determined as a first measuring point (107), a distance of the first measuring point (107) to the zero position (19) of the detection field (18) is stored as first height (h1=h(α)), the vertically oriented laser beam (102) is inclined in an opposite inclination direction at a negative inclination angle (−α), an incident position of the oppositely inclined laser beam (108) on the detection field (18) is determined as a second measuring point (109), a distance of the second measuring point (109) to the zero position (19) of the detection field (18) is stored as a second height (h2=h(−α)) and the first distance (d1) is calculated from the inclination angle (α) and a height difference (Δh=h1−h2) between the first height (h1) and the second height (h2).

7. The method according to claim 3, wherein the rotating laser (11) is oriented in the defined state, the second laser beam (23) is moved at a speed (vR), a signal length (ts) of the second laser beam on the detection field (18) of the laser receiver (12) is determined, and the second distance (d2) is calculated from the speed (vR) of the second laser beam, the signal length (ts) of the second laser beam, and a detection width (BD) of the detection field (18).

8. The method according to claim 1, wherein an inclination of the laser receiver (12) relative to a direction of gravity (24) is determined as a first vertical angle (φ1) in a first, vertical plane and/or as a second vertical angle (φ2) in a second vertical plane, wherein the first vertical plane is spanned by the direction of gravity (24) and a perpendicular vector (110) of the detection field (18), and wherein the second vertical plane is spanned by a longitudinal direction (25) and a transverse direction (26) of the detection field (18).

9. The method according to claim 8, wherein the first vertical angle (φ1) and/or the second vertical angle (φ2) are multiplied by an angle-dependent correction factor cos(90°−φ1), cos(90°−φ2), 1/cos(90°−φ2).

10. The method according to claim 1, wherein for the orientation of the vertical axis (53) in the defined state, a plurality of zero positions (v3) are recorded depending on a temperature (T) or on a measured value (L) dependent on the temperature (T) and are stored in a characteristic curve.

11. The method according to claim 10, wherein the temperature or the measured value (L) of the rotating laser (11) is measured, a zero position (v3) associated with the temperature (T) or measured value (L) is determined from the characteristic curve, and the vertical axis (53) is oriented in the state defined by the zero position (v3).

12. The method according to claim 11, wherein the temperature (T) is measured by an inclination sensor (115) which includes a housing (117) that is filled with a liquid (118) and a gas bubble (116), a light source (119) and a photo detector (120).

13. The method according to claim 12, wherein an additional characteristic curve of a temperature (T) and bubble length (L) of the gas bubble (116) is stored, the bubble length (L) of the gas bubble (116) is measured using the light source (119) and the photo detector (120), and the temperature (T) associated with the measured bubble length (L) is determined by the additional characteristic curve.

14. The method according to claim 1, wherein a correction angle ($\theta$) is calculated from the measurement distance (Dv), the first height offset (H1) and the second height offset (H2) and wherein the correction angle ($\theta$) is stored as a new zero position for orienting the vertical axis (53) in the defined vertical state when the difference ($\Delta$) is greater than the maximum difference ($\Delta$max).

15. The method according to claim 14, wherein the calibrated vertical axis (53) is checked in an additional check loop, wherein the vertical state of the vertical axis (53) is defined by the new zero position.

\* \* \* \* \*